US007316428B2

(12) United States Patent
Takayanagi et al.

(10) Patent No.: US 7,316,428 B2
(45) Date of Patent: Jan. 8, 2008

(54) CONNECTION VERIFYING DEVICE AND CONNECTION VERIFYING STRUCTURE FOR A PIPE AND A CONNECTOR

(75) Inventors: Akira Takayanagi, Aichi-ken (JP); Tomoki Inoue, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/679,747

(22) Filed: Oct. 6, 2003

(65) Prior Publication Data

US 2004/0066034 A1 Apr. 8, 2004

(30) Foreign Application Priority Data

Oct. 7, 2002 (JP) ............................. 2002-294211
Nov. 6, 2002 (JP) ............................. 2002-323215

(51) Int. Cl.
*F16L 21/06* (2006.01)
*F16L 35/00* (2006.01)
(52) U.S. Cl. .......................... 285/319; 285/81; 285/87; 285/93; 285/921
(58) Field of Classification Search ................. 285/81, 285/87, 88, 93, 319, 921
See application file for complete search history.

(56) References Cited

U.S. PATENT DOCUMENTS

| | | | | |
|---|---|---|---|---|
| 5,303,963 A * | 4/1994 | McNaughton et al. ...... | 285/319 |
| 6,082,779 A * | 7/2000 | Lesser et al. ................. | 285/93 |
| 6,290,264 B1 * | 9/2001 | Inoue .......................... | 285/81 |
| 6,343,814 B1 * | 2/2002 | Bucher et al. ............... | 285/319 |
| 6,536,807 B1 * | 3/2003 | Raymond et al. ............. | 285/93 |
| 6,601,878 B2 * | 8/2003 | Ooi et al. ..................... | 285/93 |
| 6,612,622 B2 * | 9/2003 | Andre et al. ................. | 285/305 |
| 6,676,171 B2 * | 1/2004 | Bucher et al. ............... | 285/319 |
| 6,863,314 B2 * | 3/2005 | Guest .......................... | 285/81 |
| 6,866,304 B2 * | 3/2005 | Kaminski et al. ........... | 285/319 |
| 6,883,779 B2 * | 4/2005 | Borgmeier et al. ....... | 251/149.6 |
| 2002/0163183 A1 * | 11/2002 | Ooi et al. ..................... | 285/93 |
| 2003/0094813 A1 * | 5/2003 | Bucher et al. ............... | 285/319 |
| 2003/0168855 A1 * | 9/2003 | Kaminski et al. ........... | 285/319 |

FOREIGN PATENT DOCUMENTS

EP 0 484 690 5/1992

(Continued)

OTHER PUBLICATIONS

Patent Abstract of Japan Publication No. 2002-213673; Fitting-Sensing Device, Jul. 2002.

(Continued)

*Primary Examiner*—James M. Hewitt
(74) *Attorney, Agent, or Firm*—Andrus, Sceales, Starke & Sawall, LLP

(57) ABSTRACT

Connection verifying device for a pipe and a connector has a body portion, a stop and verification arm and an abutment finger. The body portion includes an abutment plate and a fit-on portion. The stop and verification arm extends from an outer periphery of the abutment plate in one axial direction, while the abutment finger protrudes from one axial end of the fit-on portion in one axial direction. The abutment finger is arranged so as to abut and urge an annular projection of a pipe into an engagement slit of a retainer when the pipe and the connector are in half-fitting relation.

5 Claims, 25 Drawing Sheets

FOREIGN PATENT DOCUMENTS

| | | |
|---|---|---|
| JP | 6-45191 | 6/1994 |
| JP | 7-43583 | 9/1995 |
| JP | 9-269088 | 10/1997 |
| JP | 10-252965 | 9/1998 |
| JP | 10-252969 | 9/1998 |
| JP | 11-201355 | 7/1999 |
| JP | 2001-193885 | 7/2001 |
| JP | 2001-221388 | 8/2001 |
| JP | 2001-349487 | 12/2001 |
| JP | 2002-213673 | 7/2002 |
| JP | 2002-317892 | 10/2002 |

OTHER PUBLICATIONS

Patent Abstract of Japan Publication No. 2001-349487; Pipe Joint, Dec. 2001.

Patent Abstract of Japan, Publication No. 09269088; Applicant: Toyoda Gosei Co. Ltd., Oct. 1997.

Notification of Reasons for Refusal, Patent Application No. 2002-294211; Drafting Date Nov. 14, 2006.

Notification of Reasons for Refusal, Patent Application No. 2002-3232151; Drafting Date Nov. 22, 2006.

* cited by examiner

FIG. 8
(a)
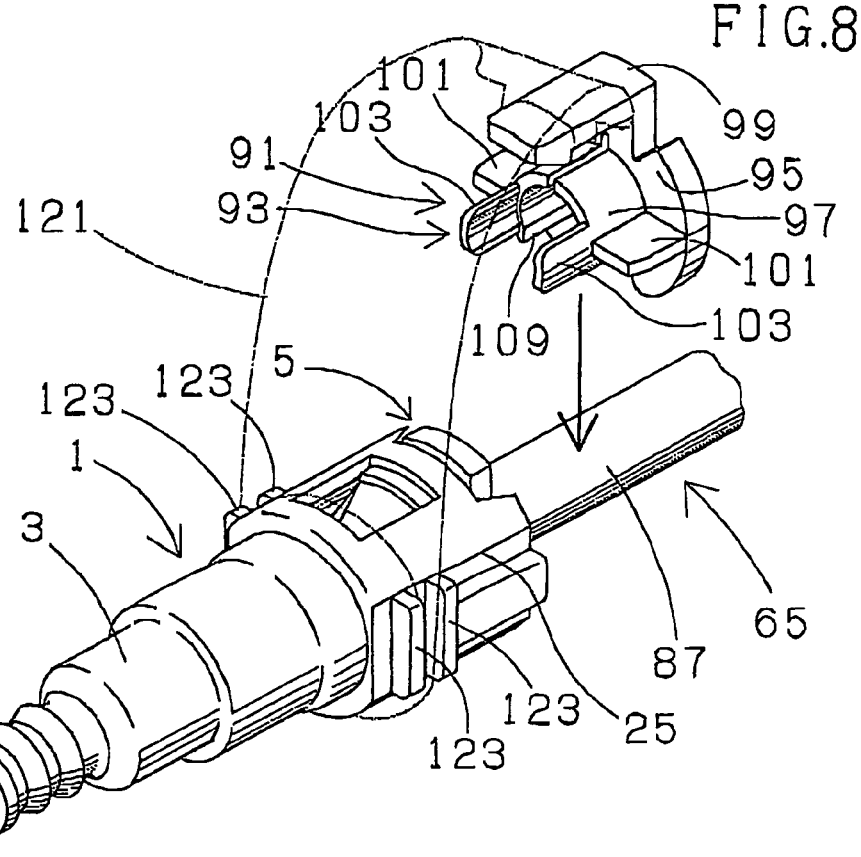
(b)
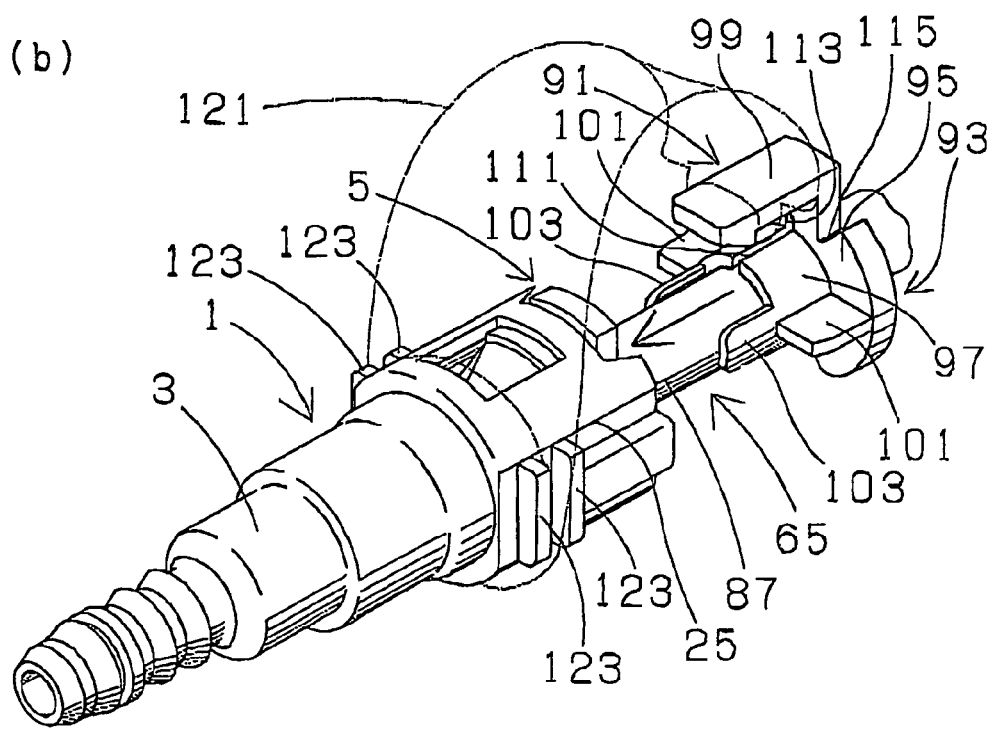

FIG.19
(a)
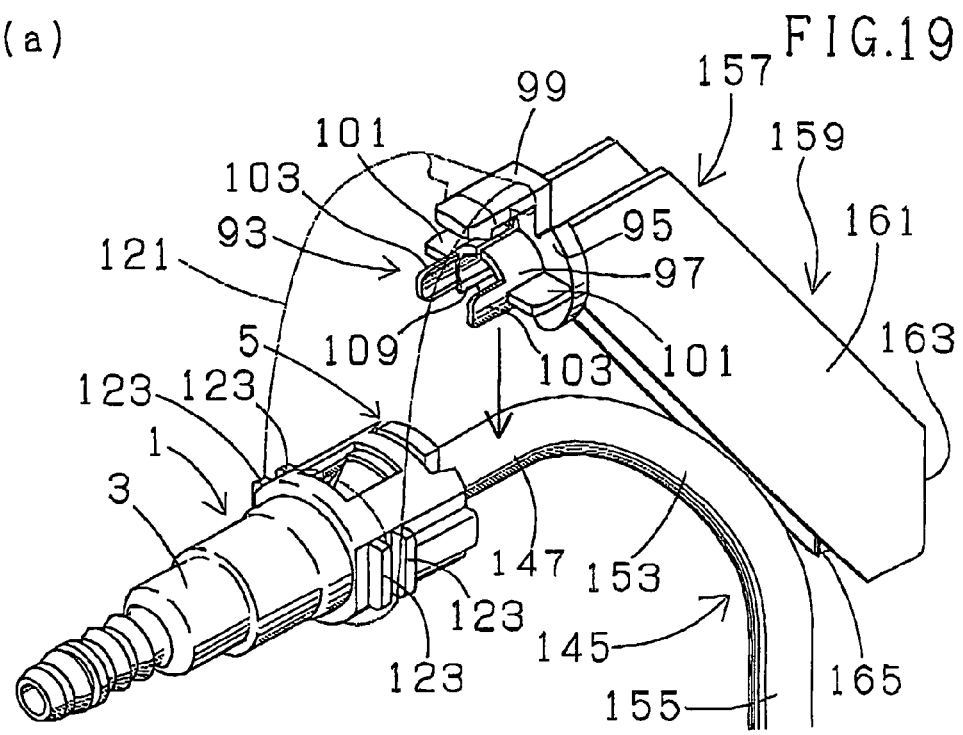
(b)
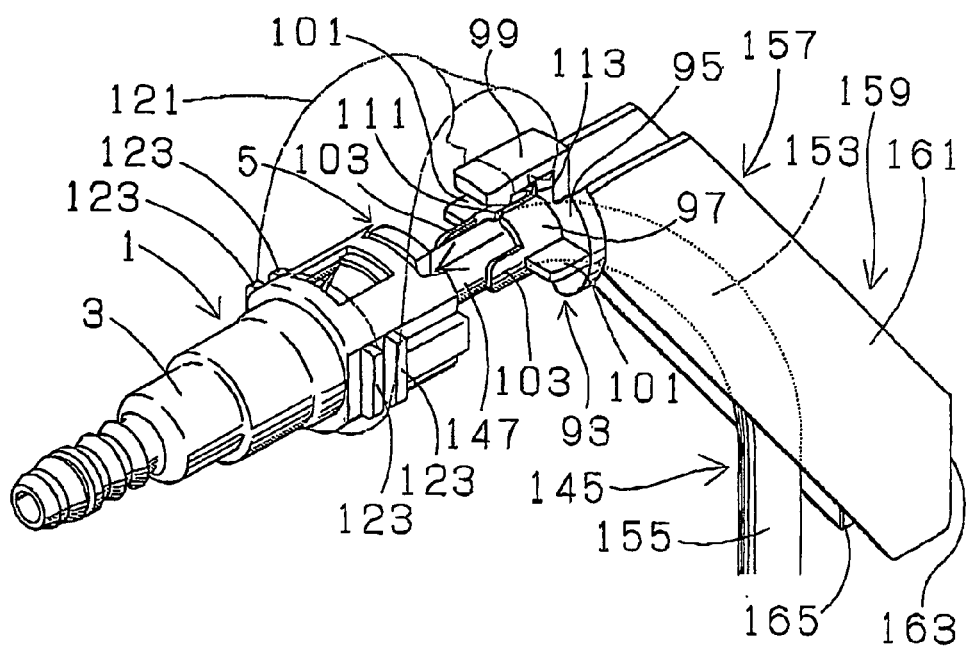

CONNECTION VERIFYING DEVICE AND CONNECTION VERIFYING STRUCTURE FOR A PIPE AND A CONNECTOR

BACKGROUND OF THE INVENTION

The present invention relates to a connection verifying device and a connection verifying structure for a pipe and a connector to verify that a pipe correctly snap-fits in and is mechanically connected to a connector which is adapted, for example, in assembly in a gasoline fuel piping of an automobile.

In a fluid piping structure, for example, a gasoline fuel piping structure where a tube is joined to a pipe, a connector is used for joining the tube to the pipe. In such piping system, for example, the pipe is formed with an annular engagement projection on and around an outer peripheral surface of an inserting side to define an inserting end portion. Then, the inserting end portion of the pipe is inserted and fitted in the connector so that the annular engagement projection snap-engages in the connector to provide locking relation between the pipe and the connector. In such a manner, connection between the pipe and the connector is completed. A connector or a quick connector adapted in this manner comprises a tubular connector housing provided with a tube connecting portion on one end of the connector housing along an axis of the connector housing and a retainer holding portion on the other end thereof, and retainer means which is held by the retainer holding portion of the connector housing. The retainer means is formed in an annular or generally annular shape and has, for example, an engagement slit as connection engageable portion or a projecting engagement claw of which one axial end or one axial end portion is formed as connection engageable portion. The inserting end portion of the pipe is inserted in the connector or the connector housing via an opening so that the annular engagement projection of the pipe snap-engages with the engagement slit or the projecting engagement claw, and thereby the pipe is fitted in and mechanically connected to the connector.

Here, the annular engagement projection of the pipe progresses or moves relatively in an axial direction while deforming the retainer means and consequently is engaged with the engagement slit or the projecting engagement claw. Therefore, unless an operator takes care sufficiently to complete connection between the pipe and the connector, the inserting end portion of the pipe might not be fully inserted into the retainer holding portion of the connector housing, or the annular engagement projection might not engage with the engagement slit or the projecting engagement claw of the retainer means. That is, the pipe might be in so-called half-fitting relation with respect to the connector. In case that a piping system is used while the pipe is incompletely connected to the connector, the inserting end of the pipe might move backward or in the other axial direction to a position of sealing member which seals between the connector and the pipe. In this state, sealing property by a sealing member therebetween becomes insufficient, and as a result an inner fluid may leak out.

Then, connection verifying means for a pipe and a connector is demanded in order to verify fit-in relation between the pipe and the connector. As for connection verifying means for a pipe and a connector, such connection verifying device for a pipe and a connector is known which is configured to be fitted to or mounted on a retainer holding portion of a connector housing in which the pipe is inserted to verify that the pipe correctly fits-in or is mechanically connected to the connector (for example, refer to following Document 1 below). If this connection verifying device is adapted, a pipe may be formed with an annular verifying projection on an outer peripheral surface thereof on an end opposite to a leading end of the pipe (or on an end distal to the leading end of the pipe), namely the other end of the pipe, with respect to an annular engagement projection. Here, when the pipe is in half-fitting relation with respect to a connector, the annular verifying projection is located toward an axial direction away from the tube connecting portion, namely the other axial direction, the connection verifying device cannot be fitted to the connector, a connector housing or a retainer holding portion due to confliction with the annular verifying projection. On the other hand, another connection verifying device is known which cannot be fitted to a connector when a pipe is in half-fitting relation with respect to the connector in spite of without an annular verifying projection (for example, refer to following Document 2 below). In this connecting verifying device, a detector portion of horseshoe-shape in cross-section is slidingly moved in one axial direction on a retainer holding portion so as to be engaged in a stopper portion of the connector housing. Thereby the connection verifying device is mounted on the connector housing while fitting on an outer side of the retainer holding portion. This connection verifying device is configured such that the detector portion cannot be engaged with the stopper portion as a retainer is diametrically expanded when the pipe is in half-fitting relation with respect to the connector. And, when the retainer is not diametrically expanded in spite of half-fitting relation between the pipe and the connector, an annular engagement projection (flange) of the pipe is pushed by a detector piece to move forward, and consequently the retainer is thereby diametrically expanded. However, as the detector portion restrains the retainer from being diametrically expanded and allowing the annular engagement projection of the pipe to pass through, the annular engagement projection stops short of a connection engageable portion of the retainer. Therefore, the detector piece which abuts the annular engagement projection of the pipe disturbs engagement of the detector portion with the stopper portion.

Document 1 JP, A, 2002-213673
Document 2 JP, A, 2001-349487

In the connection verifying device disclosed in the Document 2, an annular verifying projection is not formed on the pipe. However, the detector portion cannot be engaged with the stopper portion when the pipe and the connector are in half-fitting relation, and thereby the pipe is prevented from being used in half-fitting relation with the connection. And, by engaging the detector portion with the stopper portion, it can be verified that the pipe is correctly connected to the connector. Further, the connection verifying device also has a stop function with respect to the pipe, as the detector portion restrain the retainer from diametrically expanding once the connection verifying device is fitted on the connector.

However, in case of adapting this connection verifying device, when an operator finds the pipe and the connector in half-fitting relation, an operator necessarily has to halt mounting of the connection verifying device, push-insert the pipe until the pipe is correctly fitted in and connected to the connector, and then mount the connection verifying device on the connector again. Therefore, when the pipe is in half-fitting relation with respect to the connector, it is troublesome for the operator to connect again the pipe and the connector. In addition, it is fear in this connection verifying device that a projecting engagement claw (stop projection) of the retainer is deformed and the annular engagement projection of the pipe escapes the projecting engagement claw. And, as only one detector piece is provided at one circumferential position, it cannot be sufficiently prevented that the annular engagement projection of the pipe which escapes the projecting engagement claw of the retainer further moves in a direction of escaping the connector. Thus, secure stop function cannot be expected of this connection verifying device.

Accordingly, it is an object of the present invention to provide a connection verifying device for a pipe and a connector having a connection assist function to assist smooth connecting operation of a pipe and a connector and a reliable stop function with respect to the pipe. The connection verifying device of the present invention allows an operator to complete and verifying correct connection between a pipe and a connector in a single continuous uninterrupted connecting operation. It is further object of the present invention to provide a connection verifying structure for a pipe and a connector adapting the connection verifying device.

SUMMARY OF THE INVENTION

In order to achieve a foregoing object, according to the present invention, there is provided a novel connection verifying device for a pipe and a connector to verify correct or complete mechanical connection between a pipe having an inserting end portion formed with an annular engagement projection on an outer peripheral surface thereof and a generally cylindrical connector. The connector is formed with a tube connecting portion on one end (one end along an axis of a quick connector or a connector housing) thereof and has retainer means on the other end (the other end along the axis of the quick connector or the connector housing) thereof. Here, the tube connecting portion means a portion to be connected to a variety of a mating member to be joined with the pipe. The retainer means has a connection engageable portion, and includes disengageable or non-engageable part or parts on circumferentially fixed position or positions of the retainer, the connection engageable portion or the connector. The inserting end portion of the pipe is inserted in the connector through or via an opening so that the annular engagement projection is snap-engaged with the connection engageable portion of the retainer. Here, a term "axial" means an axial direction of a relevant member, a connector or a pipe.

The connection verifying device comprises a body portion to be fitted or mounted to, on or in the other end of the connector, an abutment finger protruding or extending from the body portion in one axial direction and connection verification means or verification means formed or constructed on the body portion and having an engaging portion. The body portion is mounted to the other end of the connector so that the abutment finger is inserted or enters in the connector through the opening and the engaging portion of the verification means is engaged in the other axial direction with a stop portion formed on an axially fixed position of the connector. The abutment finger is formed so that one end or one end portion thereof extends or reaches to an axial position generally identical to an axial position of the connection engageable portion, for example, on the disengageable parts while the engaging portion of the verification means engages with the stop portion of the connector. The verification means is formed so that the engaging portion thereof is located toward or on an end opposite to a leading end of the tube connecting portion with respect to the stop portion while the abutment finger abuts the annular engagement projection of the pipe which does not yet engage with or is in half-fitting relation with the connection engageable portion of the retainer means. And, the abutment finger is formed further so as to move the annular engagement projection in one axial direction with respect to the retainer means or the connector, namely relatively in one axial direction with respect to the retainer means or the connector to engage the annular engagement projection with the connection engageable portion when the abutment finger abuts the annular engagement projection of the pipe which does not yet engage with the connection engageable portion of the retainer means (connection assist function for a pipe or an annular engagement projection and a connector or a connection engageable portion). If an operator tries to mount the connection verifying device in or to the connector, for example, by sliding the connection verifying device over the pipe when the annular engagement projection of the pipe is not snap-engaged with the connection engageable portion of the retainer means, the abutment finger or an abutment push finger abuts the annular engagement projection of the pipe. In this state, the engaging portion of the verification means or stop and verification means does not reach the stop portion of the connector. When the operator continues mounting operation of the connection verifying device, for example, by further sliding the connection verifying device over the pipe to mount the connection verifying device therein or thereto, the abutment finger pushes and moves the annular engagement projection of the pipe respectively in one axial direction and snap-engages the annular engagement projection with the connection engageable portion of the retainer means. Here, the retainer means is configured so that the annular engagement projection moves toward or relatively toward the connection engageable portion when pushed by the abutment finger. If one end, or one end portion of the abutment finger is located on the non-engageable part of the retainer means, the abutment finger does not disturb engagement of the annular engagement projection of the pipe with the connection engageable portion of the retainer means. And, when the annular engagement projection of the pipe is snap-engaged with the connection engageable portion of the retainer means, the engaging portion of the verification means can be engaged with the stop portion of the connector. Engagement relation between the engaging portion of the verification means and the stop portion of the connector allows to fit or mount the connection verifying device to the connector so as not to be displaced in the other axial direction with respect to the connector. The abutment finger may be formed so as to be along an outer peripheral surface of the pipe or a portion of the pipe except the annular engagement projection or in contact relation (including relation just before contact) with an outer peripheral surface of the pipe.

When the engaging portion of the verification means is engaged with the stop portion of the connector, one end or one end portion of the abutment finger is located on a position generally axially identical to a position of the connection engageable portion of the retainer means, namely closely adjacent to a position to abut the annular engagement projection of the pipe (connection verifying function for a pipe or an annular engagement projection and a connector or a connection engageable portion). At the same time, as one end portion thereof may be located on the non-engageable part of the connection engageable portion of the retainer, even if the pipe deforms the connection engageable portion and is likely displaced in the other axial direction with respect to the retainer means, the annular engagement projection abuts the abutment finger and thereby the pipe is not allowed to be displaced so that the annular engagement projection escapes the connection engageable portion of the retainer means.

In order for smooth relative movement of the annular engagement projection of the pipe in one axial direction with respect to the retainer means while the pipe is in half-fitting relation with respect to the connector, it is required for the abutment finger to push the annular engagement projection thereof stably or uniformly, not incliningly. Therefore, preferably, a pair of the disengageable parts are formed in diametrically symmetrical positions of the retainer means, the connection engageable portion or the connector, while a pair of the abutment fingers are formed on diametrically symmetrical positions on the body portion so as to correspond to the disengageable parts. This configuration exerts a stable or uniform escape-resistant force on the annular engagement projection against movement of the annular engagement projection to escape the connection engageable portion of the retainer means, and thereby a stop function is enhanced.

The connection verifying device may be configured so as to be fitted to the connector by moving slidingly over the pipe. In this case, preferably the body potion is formed in C-shape or C-shape in cross-section so as to be snap-fitted on the pipe. This configuration eliminates a fear that the connection verification device is mistakenly dropped out of the pipe when moving slidingly over the pipe.

The connection verifying device is usually mounted or fitted to the other end portion of the connector until before an operator sets about connection of the pipe to the connector, and is removed when the operator sets about connection of the pipe. If the body portion is formed in C-shape or C-shape in cross-section so as to be snap-fitted on the pipe or a portion of the pipe except the annular engagement projection, the annular engagement projection of the pipe is not allowed to pass through the connection verifying device, and thereby it is prevented that the pipe is mistakenly inserted in the connector while the connection verifying device is fitted to the connector. Moreover, here, if an operator misrecognizes that the pipe is correctly connected to the connector while the pipe is only inserted in the connection verifying device, as one end or an inserting end of the pipe usually does not reach sealing member which seals between the connector and the pipe, incorrect connection of the pipe to the connector is to be found at leakage test.

The connection verifying device according to the present invention is also adapted to the case that a pipe securely fixed is relatively connected to the connector. Here, when one end portion of the abutment finger is inserted or put in the opening of the connector, an operator may fit the connection verifying device to the connector by grasping firmly the connector and the connection verifying device in an axial direction by hand and attracting the connection verifying device relatively toward the connector and so on. For example, in the case of half-fitting relation between the pipe and the connector, the connection verifying device assists relative insertion of the pipe by pushing the annular engagement projection of the pipe with the abutment finger and allow complete insertion or correct connection of the pipe to the connector while verifying correct connection therebetween.

Also a connection verifying structure for a pipe and a connector according to the present invention comprises a generally cylindrical connector including a tube connecting portion on one end thereof and retainer means on the other end thereof, a pipe having an inserting end portion formed with an annular engagement projection on an outer peripheral surface thereof, and a connection verifying device for a pipe and a connector fitted or mounted to the connector to verify mechanical connection between the pipe and the connector. The retainer means has a connection engageable portion, for example partly with disengageable part or parts on circumferentially fixed position or positions of the retainer means, the connection engageable portion or the connector. However, the connection engageable portion may be formed in complete annular shape The inserting end portion is inserted in the connector via or through an opening so that the annular engagement projection is snap-engaged with the connection engageable portion. The connection verifying device includes a body portion fitted or mounted to the other end of the connector, an abutment finger protruding or extending from the body portion in one axial direction and inserted in the connector via or through the opening, and verification means constructed on the body portion. The abutment finger extends to an axial position generally identical to an axial position of the connection engageable portion on the disengageable part, and the engaging portion of the verification means engages with the stop portion of the connector. The engaging portion is engaged in the other axial direction with the stop portion formed on an axially fixed portion of the connector. The engaging portion is formed to be located on an end opposite to a leading end of the tube connecting portion with respect to the stop portion of the connector while the abutment finger abuts the annular engagement projection of the pipe which does not yet engage with the connection engageable portion. The abutment finger is formed so as to move the annular engagement projection relatively in one axial direction with respect to the retainer means to engage the annular engagement projection with the connection engageable portion when the abutment finger abuts the annular engagement projection of the pipe which does not yet engage with the connection engageable portion of the retainer means. An inner surface of the other end of the connector or the retainer means may be formed with an inserting path for insertion of the abutment finger, which extends, for example, from the other end to the non-engageable part of the retainer means.

If the body portion is formed with a connector connection portion to engage with a connector or a connector housing, for example, an inner surface side of the connector or the connector housing non-rotatably and a pipe connecting portion to be connected to a bent portion of the pipe in anti-rotating relation, the connection verifying device or the connection verifying structure functions also as anti-rotation means with respect to the pipe and the connector. Here, the abutment finger or/and the verification means is eliminated from the body portion, an anti-rotation device for a pipe and a connector is configured which restrains effectively relative rotational movement between the connector and the pipe.

The pipe connecting portion may be provided with a pair of embracing or clip members extending in the other axial direction so as to embrace or clip a side of the bent portion of the pipe. A pair of the embracing or clip members may be connected integrally each other on the other end portions. Here, the embracing or clip members embrace or clip the side of the bent portion of the pipe on one end with respect to the other end portions.

The connection verifying device and the connection verifying structure of the present invention may allow an operator to verify connecting relation between a pipe and a connector and to correctly and easily connect a pipe and a connector which are in half-fitting relation. And the connection verifying device and the connection verifying structure of the present invention serve as an excellent stop function with respect to the pipe.

Now, the preferred embodiments of the present invention will be described in detail with reference to the drawings.

BRIEF DESCRIPTION OF THE DRAWINGS

FIG. 8a is a view explaining that the first connection verifying device is mounted to an assembled unit of the first quick connector and the first pipe, and showing that the first connection verifying device is to be mounted to an inserting side portion of the first pipe.

FIG. 8b is a view explaining that the first connection verifying device is mounted to an assembled unit of the first quick connector and the first pipe, and showing that the first connection verifying device is mounted to the assembled unit to be slid on the inserting side portion in one axial direction.

FIG. 19a is a view explaining that the third connection verifying device is mounted to an assembled unit of the first quick connector and the second pipe, and showing that the third connection verifying device is to be mounted on an inserting side portion of the second pipe.

FIG. 19b is a view explaining that the third connection verifying device is mounted to an assembled unit of the first quick connector and the second pipe, and showing that the third connection verifying device is mounted to the assembled unit to be slid on the inserting side portion in one axial direction.

DETAILED DESCRIPTION OF THE PREFERRED EMBODIMENTS

Figure 1:
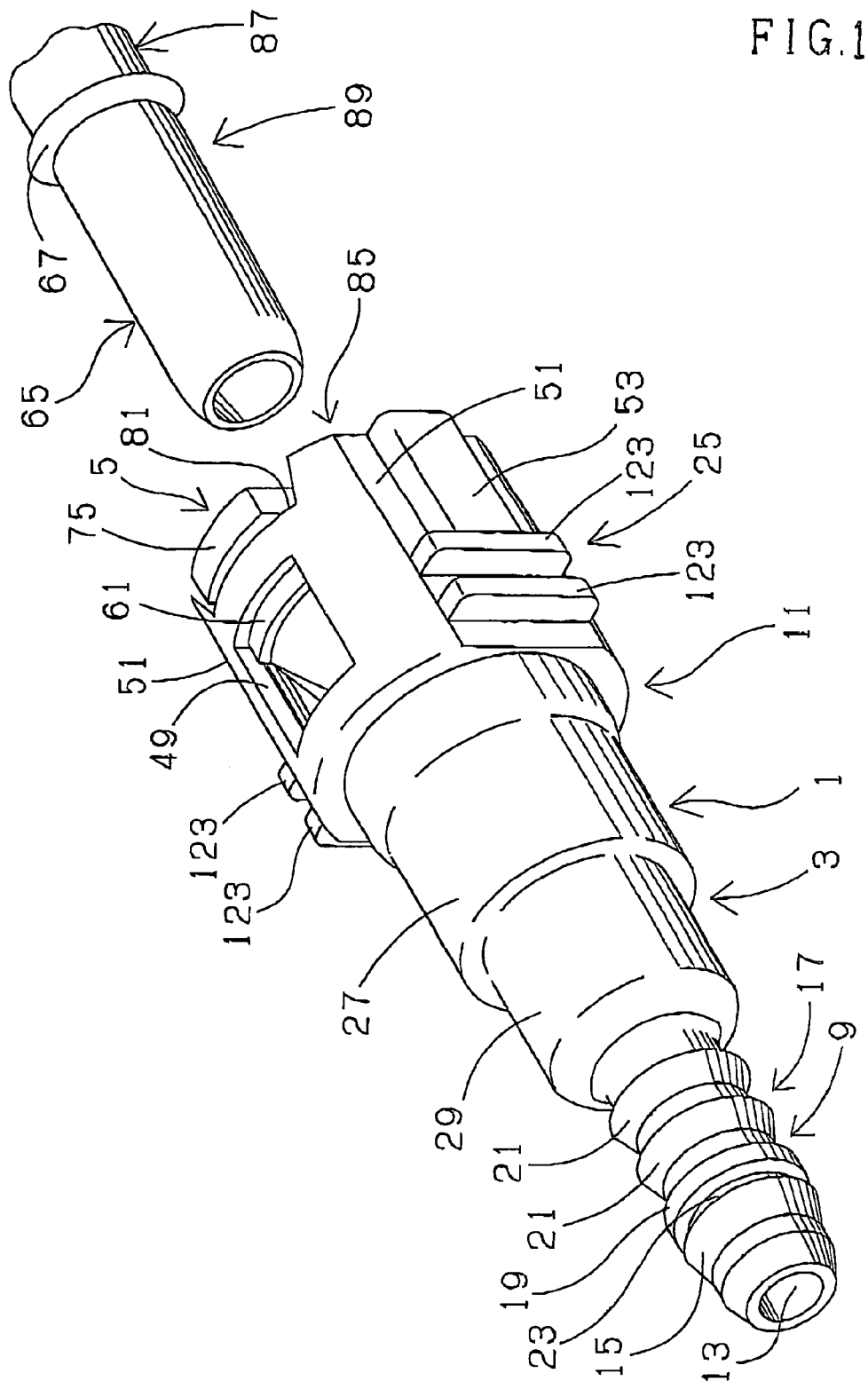
FIG. 1 is an perspective view of a first quick connector and a first pipe to be adapted in a first connection verifying structure for a pipe and a connector according to the present invention.

A first connection verifying structure for a pipe and a connector according to the present invention is explained with reference to FIGS. 1 to 11.

A first quick connector 1, which is adapted for assembly in a gasoline fuel piping of an automobile and adapted in the first connection verifying structure, for example, made of resin, comprises a tubular connector housing 3, a generally annular retainer 5 (retainer means) and seal means 7. The connector housing 3 made of glass fiber reinforced polyamide (PA·GF), as well shown in FIGS. 1 and 2, integrally comprises a cylindrical resin tube connecting portion 9 on an end of the connector housing 3 (one end along an axis of a quick connector 1 or a connector housing 3) and a generally cylindrical pipe inserting portion 11 on the other end thereof (the other end along the axis of the quick connector 1 or the connector housing 3), and is provided with a through-bore 13 through from one end to the other end thereof. The resin tube connecting portion 9 comprises one axial end portion 15 having an outer peripheral surface generally expanding gently in diameter toward the other end, and the other axial end portion 17 having an outer peripheral surface extending like a simple cylindrical shape on the other end with respect to the one axial end portion 15. The other axial end portion 17 is provided on an outer peripheral surface with an annular projecting stop portion 19 of rectangular in cross-section and two annular projecting stop portions 21, 21 of right-angle triangle in cross-section expanding in diameter in a direction toward the other end. The annular projecting stop portions 19, 21, 21 are arranged in axially spaced relation sequentially from one end to the other axial side portion 17. A resin tube is tightly fitted on and connected to an outer periphery or an outer peripheral surface of the resin tube connecting portion 9. An outer peripheral surface 23 on one end portion of the other axial end portion 17, namely a portion between the one axial end portion 15 and the annular projecting stop portion 19 is formed in small diameter or in relatively deep annular groove. A sealing ring (not shown) is fitted around the outer peripheral surface 23 on one end portion of the other axial end portion 17 when the resin tube is fitted on the resin tube connecting portion 9.

Figure 2:
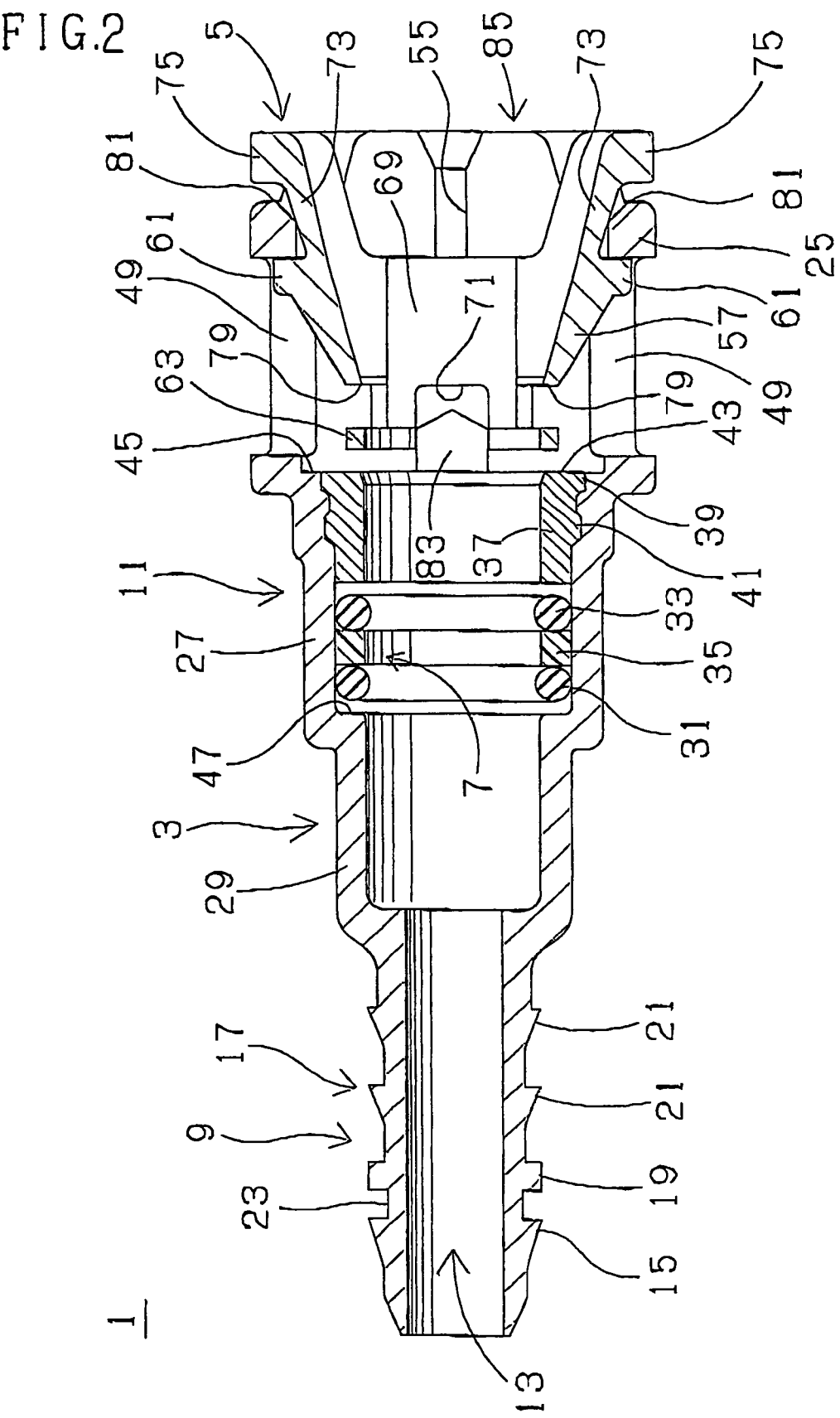
FIG. 2 is a sectional view of the first quick connector.
Figure 3:
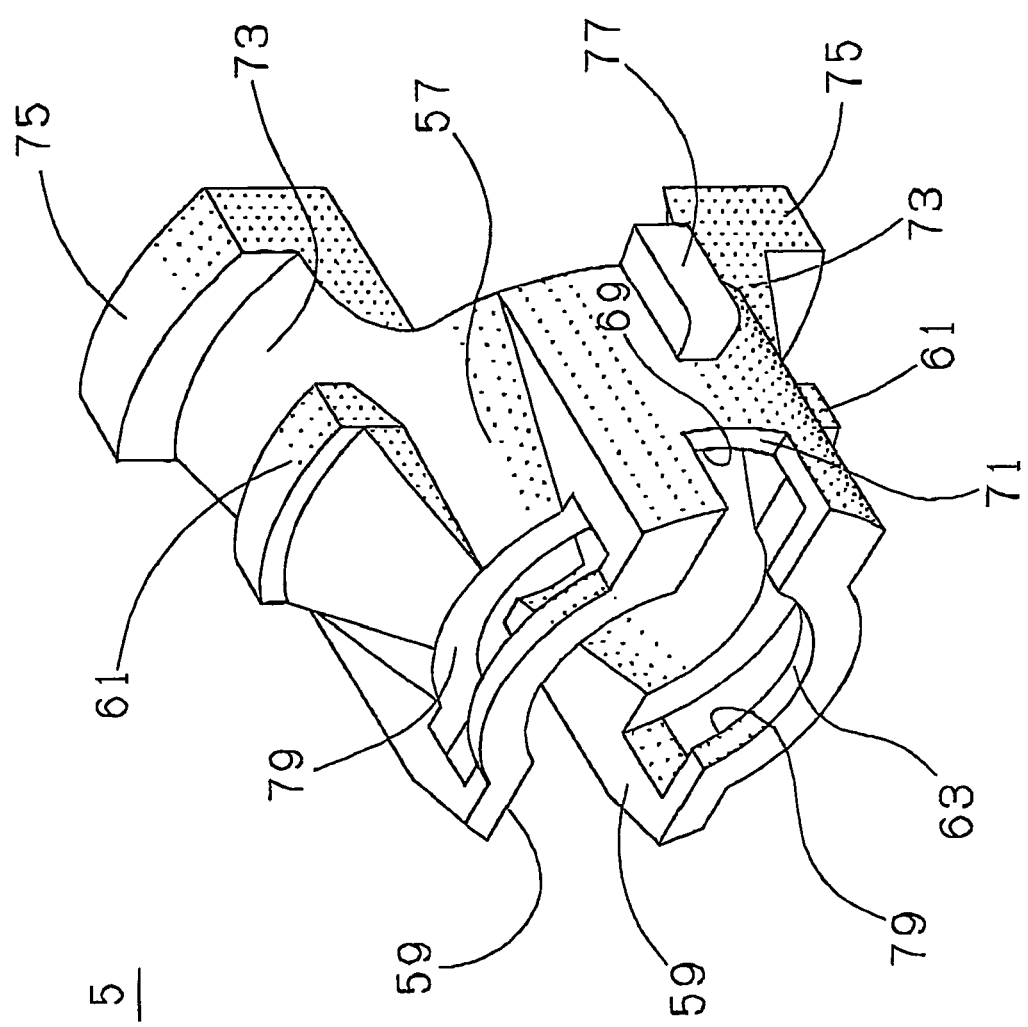
FIG. 3 is a perspective view of a retainer adapted to the first quick connector.

As shown in FIG. 2, the pipe inserting portion 11 of the connector housing 3 integrally comprises a retainer holding portion 25 of large diameter on the other end, a seal holding portion 27 and a link portion 29. The seal holding portion 27 is smaller in diameter than the retainer holding portion 25 and is located halfway between the retainer holding portion 25 and the link portion 29. The link portion 29 is further smaller in diameter than the seal holding portion 27 and is located on one end with respect to the seal holding portion 27. Within the seal holding portion 27 on one end thereof, a first O-ring 31 (sealing member) of one end and a second O-ring 33 (sealing member) of the other end are fitted axially spaced in side by side relation with an intervening collar 35 therebetween, and on the other end thereof, a resin bush 37 is fitted. The first O-ring 31 and the second O-ring 33 configure the sealing means 7. The resin bush 37 is formed in a short tubular shape, and has an inner diameter generally identical to an inner diameter of the link portion 29. The resin bush 37 is provided integrally with low annular projecting portions 39, 41 at the other end portion and a mid portion (a mid portion along an axis of the quick connector 1 or the connector housing 3) on an outer peripheral surface thereof respectively. The annular projecting portions 39, 41 are formed so as to project somewhat radially outwardly. The other end portion of an inner peripheral surface of the seal holding portion 27 is shaped so as to correspond to an outer peripheral surface of the resin bush 37 in shape. The resin bush 37 is fitted in the other end portion of the seal holding portion 27 so that an annular end surface 43 of the other end of the resin bush 37 is co-planer with an annular stepped end surface or radial surface 45 which is formed in inner side of the retainer holding portion 25 on one end thereof so as to expand radially inwardly with narrow width. The first O-ring 31 and the second O-ring 33 are axially maintained between the resin bush 37 and an annular stepped surface or radial surface 47 which is defined on one end of inside of the seal holding portion 27. The first O-ring 31 is, for example, made of fluoro-rubber (FKM) of excellent water-proof property, excellent dust-proof property, high-gasoline resistance and ozone-resistance. The second O-ring 33 is, for example, made of fluoro-silicone-rubber (FVMQ,) of excellent water-proof property, excellent dust-proof property, high low-temperature resistance and ozone-resistance.

Figure 4:
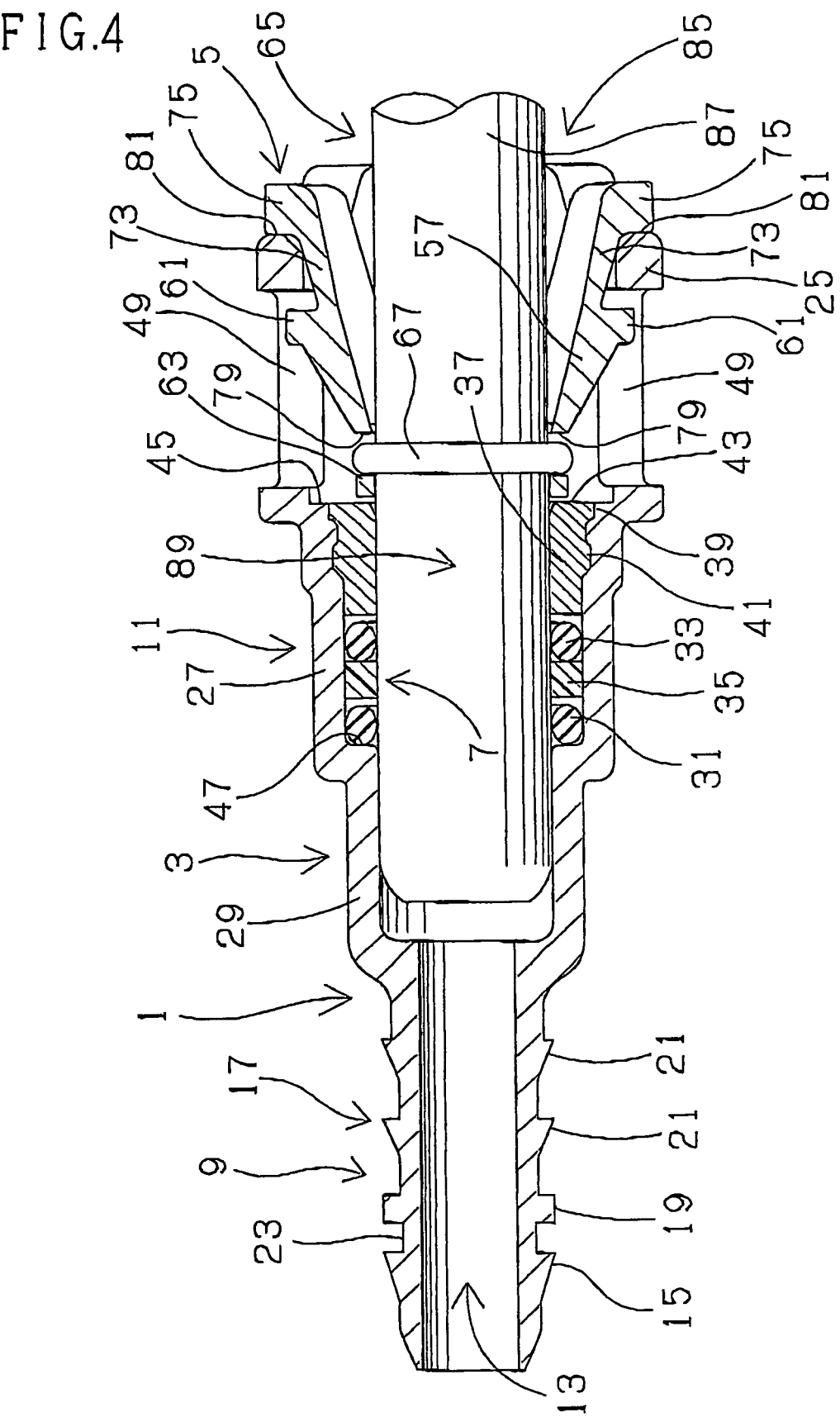
FIG. 4 is a sectional view showing that the first quick connector and the first pipe are connected.

As well shown in FIGS. 1, 2 and 4, the generally cylindrical retainer holding portion 25 of the pipe inserting portion 11 is provided with engagement windows 49, 49 in diametrically symmetrical positions and in opposed relation with one another, and flat regions 51, 51 on outer peripheral surfaces respectively between the engagement windows 49, 49 on diametrically symmetrical positions. Each of the flat regions 51, 51 is formed so as to extend, for example, generally for entire length of the retainer holding portion 25. The flat regions 51, 51 of the retainer holding portion 25 are provided with raised portions 53, 53 respectively at a widthwise center portion on the other end thereof (also refer to FIG. 5). The raised portion 53 extends in an axial direction from the other end of the flat region 51 to a position beyond a center (a center along an axis of the quick connector 1 or the connector housing 3) of the retainer holding portion 25. In an inner peripheral surface of the retainer holding portion 25, recessed engagement guides 55, 55 of trapezoid widening radially outwardly in cross-section are formed at positions of the raised portions 53, 53 respectively so as to extend along the raised portions 53, 53 from the other end of the retainer holding portion 25 to one end portions of the raised portions 53, 53 (also refer to FIG. 5).

The retainer 5 made of PA is received and fitted in the retainer holding portion 25. This retainer 5 is relatively flexible, and is formed so as to be resiliently deformable. As well shown in FIG. 3, the retainer 5 has a main body 57 of C-shape or shape like the letter C in cross-section, wherein a relatively large space for deformation is defined between circumferential opposite end portions 59, 59 thereof (inserting path of an abutment finger and non-engageable part). The main body 57 is provided with a pair of engagement tabs 61, 61 projecting radially outwardly in diametrically symmetrical positions of the other end portion thereof. An inner surface of the main body 57, except the circumferential opposite end portions 59, 59 and a portion diametrically opposed to the space for deformation, is tapered generally in the direction toward one end thereof so as to reduce gradually an inner diameter thereof. And, apart from the circumferential opposite end portions 59, 59 and a portion diametrically opposed to the space for deformation, one axial end portion 63 of the main body 57 is formed generally with an inner diameter almost identical to a first pipe 65, and smaller than an annular engagement projection 67. A portion diametrically opposed to the space for deformation of the main body 57 has an inner surface 69 (inserting path of an abutment finger) like a portion of a cylindrical inner surface shape and slightly recessed, and also has an outer surface like a portion of a cylindrical outer surface shape (also refer to FIG. 5). One axial end portion 63 of a portion (non-engageable part) diametrically opposed to the space for deformation of the main body 57 is formed with an indent 71.

Figure 5:
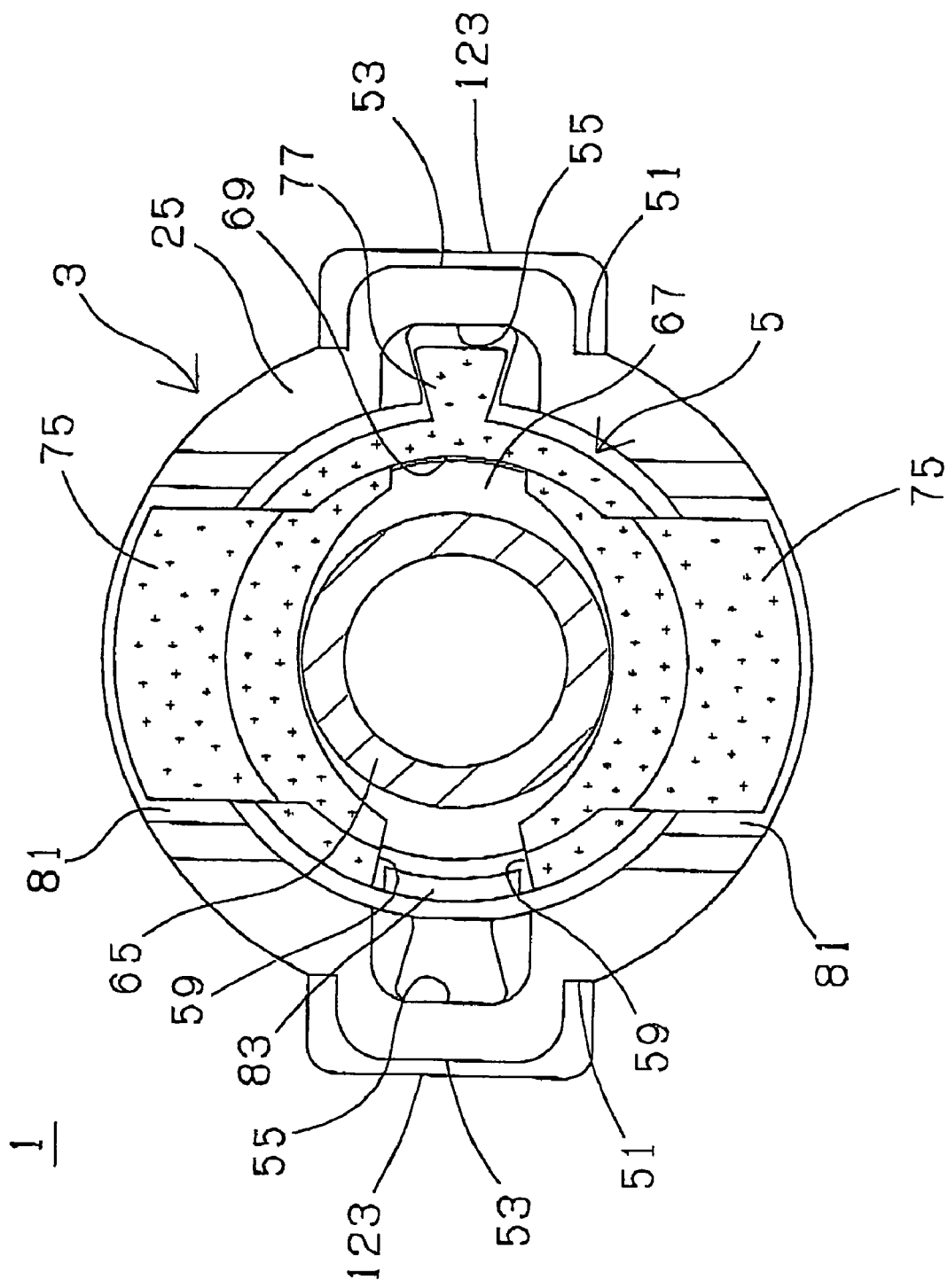
FIG. 5 is a side elevation view of the first quick connector on a side of a retainer holding portion.

A pair of operation arms 73, 73 are formed integrally on the other end portion of the main body 57 of the retainer 5 so as to extend inclining radially outwardly in the other axial direction from respective circumferential positions corresponding to the engagement tabs 61, 61. The operation arm 73 respectively has a latching end 75 projecting radially outwardly on the other end portion thereof. On an outer surface of the other end of the main body 57, an engagement rib 77 of trapezoid widening radially outwardly in cross-section is formed at position opposed to the space for deformation so as to extend relatively short in an axial direction. The engagement rib 77 is formed in circumferential thickness smaller than the recessed engagement guide 55. The one axial end portion 63 of the main body 57 is provided with engagement slits 79, 79 (connection engageable portions) extending circumferentially in opposed relation with one another. Thus configured retainer 5 is inserted and fitted in the retainer holding portion 25, so that the engagement rib 77 slidingly moves to and fits in one end of the recessed engagement guide 55, the engagement tabs 61, 61 seat in the engagement windows 49, 49 of the retainer holding portion 25 and the latching ends 75, 75 seat in a pair of receiving recessed portions 81, 81 formed in diametrically symmetrical positions of the other end portion of the retainer holding portion 25. A reference numeral 83 of FIG. 2 indicates a rotation preventive projection which is formed integrally on an inner peripheral surface of the retainer holding portion 25, and is configured to be located in the indent 71 of the main body 57 of the retainer 5 so as to restrain rotational movement of the retainer 5. As shown in FIG. 5, the other rotation preventive projection 83 of similar configuration is also formed on an inner peripheral surface of the retainer holding portion 25 in a position diametrically opposed to the one rotation preventive projection 83 so as to be located between the circumferential opposite end portions 59, 59 of the retainer 5.

The retainer 5 is restrained from escape from the retainer holding portion 25 as the engagement tab 61 respectively engages with the other end of the engagement window 49, and is restrained from rotational movement with respect to the connector housing 3 or the retainer holding portion 25 as the engagement tab 61 respectively engages with circumferentially opposite ends of the engagement window 49 and a pair of rotation preventive projections 83, 83 seat in the indent 71 and between the circumferential opposite end portions 59, 59 of the retainer 5 respectively (the drawing often shows a slight gap in a rotation preventive mechanism, but preferably no gap is defined in a rotation preventive mechanism). Additionally, the retainer 5 is firmly and elaborately restrained from rotational movement as the engagement rib 77 is fitted in the recessed engagement guide 55 in engagement relation with one another circumferentially and radially.

The first pipe 65 which is adapted in the first connection verifying structure is, for example, made of metal, as well shown in FIG. 4, is inserted in the first quick connector 1 through an opening 85 of the retainer holding portion 25, more specifically, in the main body 57 of the retainer 5 from a side of the latching ends 75, 75 of the operation arms 73, 73, and is fitted in the first quick connector 1. The first pipe 65 has an inserting side portion 87 of straight tubular shape. One end of the inserting end portion 87 is configured as inserting end portion 89 which is provided with the annular engagement projection 67 on an outer peripheral surface thereof. The first pipe 65 is pushed, and fittingly inserted into the first quick connector 1 or the connector housing 3 so that the annular engagement projection 67 relatively progresses or moves forward radially expanding inner surface of the main body 57 of the retainer 5 until the annular engagement projection 67 seats in the engagement slits or connection engageable portions 79, 79 in snap-engagement relation therewith and the inserting end portion 89 is accommodated an entire length thereof in the pipe inserting portion 11 of the connector housing 3. One end of the inserting end portion 89 (an end of an inserting side) of the first pipe 65 reaches in link portion 29 through the second O-ring 33 and the first O-ring 31, and thereby a seal is formed by the first and second O-rings 31, 33 between an outer periphery surface of the first pipe 65 or the inserting end portion 89 of the first pipe 65 and an inner peripheral surface of the first quick connector 1. Inner diameters of the resin bush 37 and the link portion 29 are generally identical to an outer diameter of the inserting end portion 89 of the first pipe 65, and one end of the inserting end portion 89 with respect to the annular engagement projection 67 is inserted in the resin bush 37 and the link portion 29 substantially without play.

Figure 6:
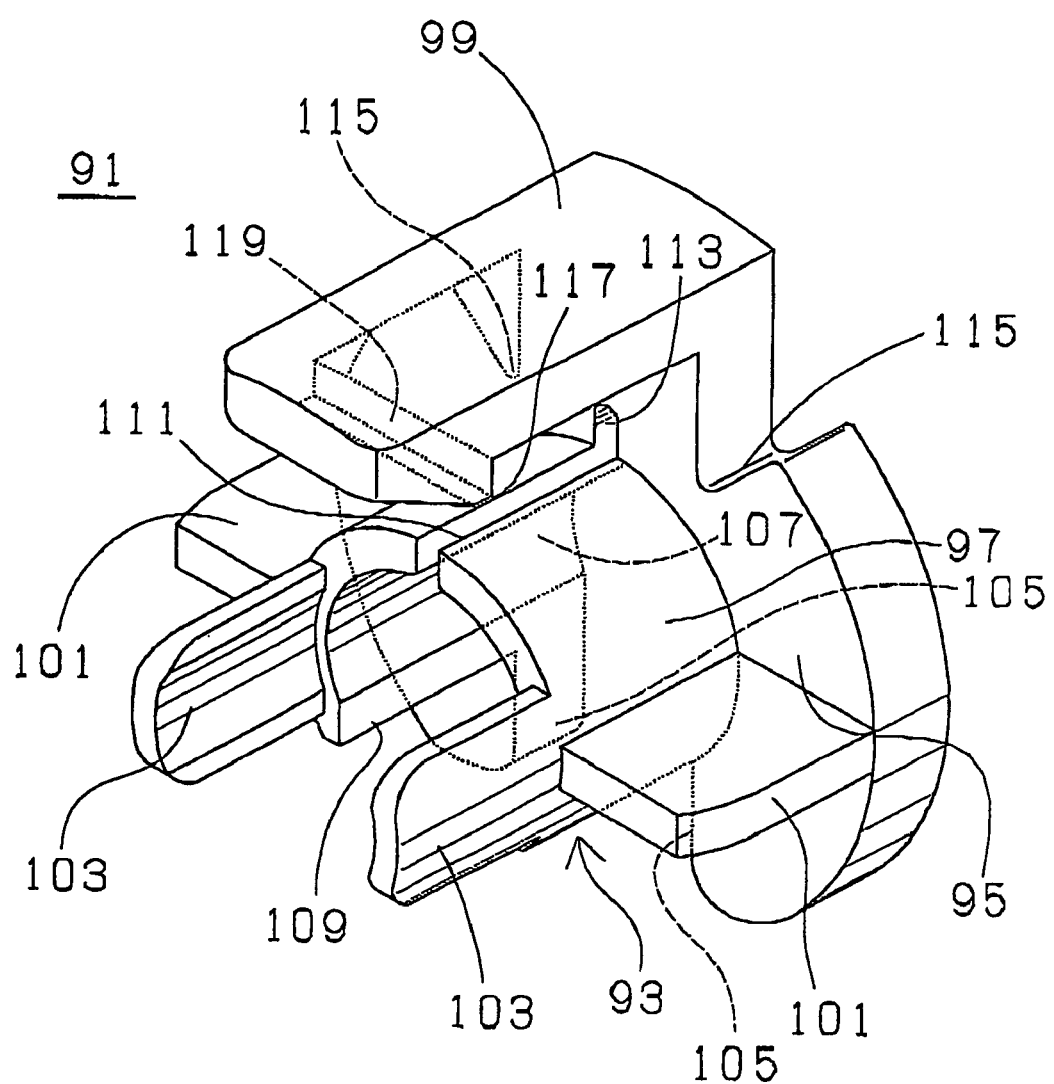
FIG. 6 is a perspective view of a first connection verifying device for a pipe and a connector to be adapted in the first connection verifying structure.
Figure 7:
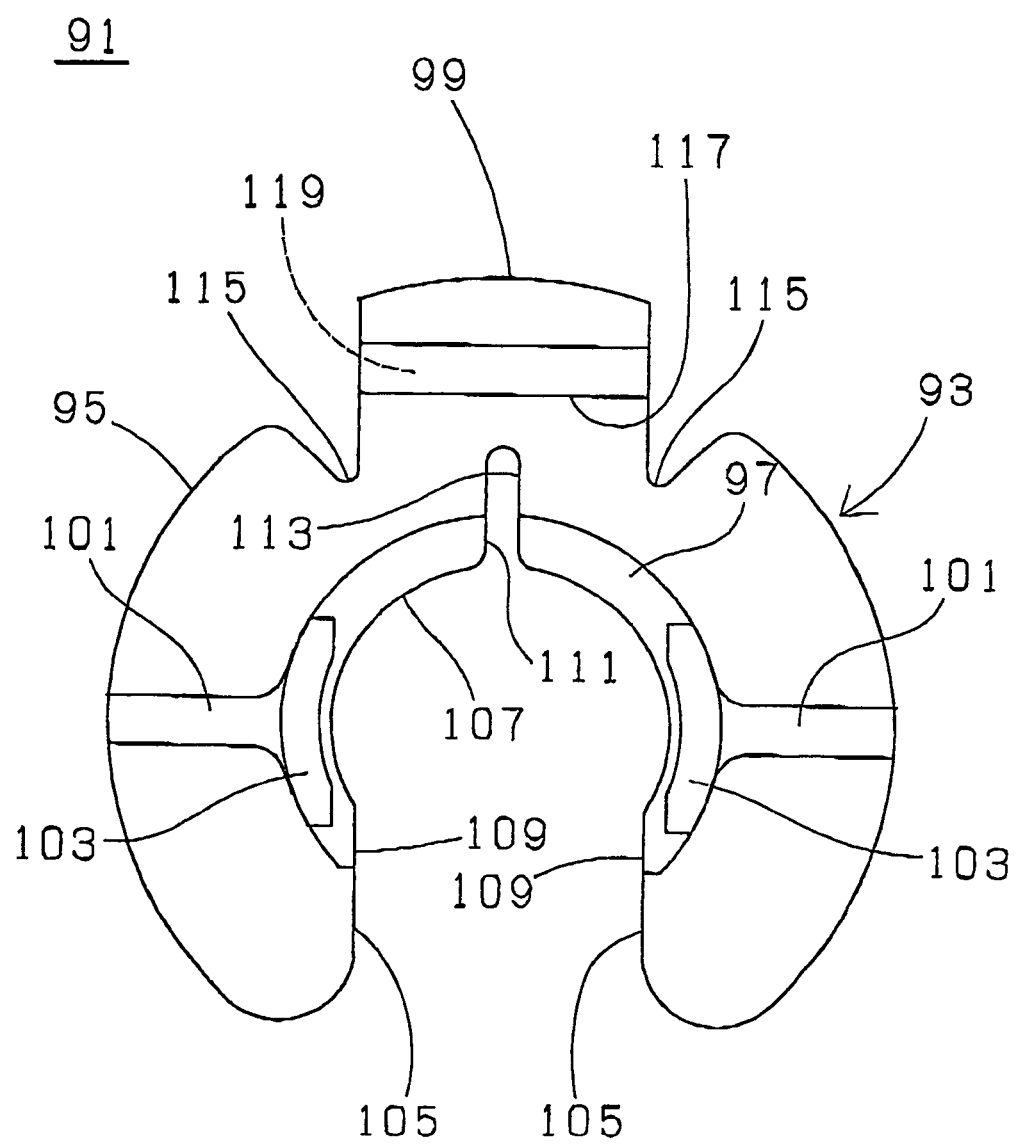
FIG. 7 is a side elevation view of the first connection verifying device.

A first connection verifying device 91 for a pipe and a connector which is adapted in the first connection verifying structure is, for example, made of resin, as well shown in FIGS. 6 and 7, comprises a body portion 93. The body portion 93 includes an abutment plate 95 of C-shape or shape like the letter C and a fit-on portion 97 of shape like the letter C or C-shape in cross-section which is formed integrally on the abutment plate 95 so as to project short from one end surface of the abutment plate 95 in a direction toward one end, or one axial direction. The first connection verifying device 91 also comprises an escape prevention verification arm or stop and verification arm 99 (verification means) with narrow width. The stop and verification arm 99 is formed integrally on the abutment plate 95 so as to extend somewhat long from an outer periphery of the abutment plate 95 in one axial direction. The first connection verifying device 91 further comprises a pair of guide plates 101, 101 generally of rectangular shape and a pair of abutment fingers or abutment push fingers 103, 103. The guide plates 101, 101 are formed integrally on the fit-on portion 97 so as to extend radially outwardly from diametrically symmetrical positions on an outer peripheral surface of the fit-on portion 97 respectively. The abutment fingers 103, 103 are also formed integrally on the fit-on portion 97 so as to extend from one end of the fit-on portion 97 in one axial direction respectively. The abutment plate 95 has an opening portion 105 with a width somewhat smaller than an outer diameter of the first pipe 65, and a fit-on recess 107 formed inside the opening portion 105. The fit-on recess 107 is shaped of about three-quarter arc with diameter generally identical to an outer diameter of the first pipe 65. Each of the abutment fingers 103, 103 are arranged in positions circumferentially corresponding to the guide plates 101, 101 respectively. The fit-on portion 97 is formed in tubular shape of about three-quarter arc in cross-section with an opening portion 109 identical to the opening portion 105 of the abutment plate 95 in width, and integrally on the one end surface of the abutment plate 95 so as to be along the fit-on recess 107 thereof. The fit-on recess 107 of the abutment plate 95 and an inner surface of the fit-on portion 97 define a continuous fit-on inner surface without step or stepped portion. The fit-on portion 97 is formed with a narrow slit 111 for entire length thereof on a position opposed to the opening portion 109, or a center portion between a pair of the guide plates 101, 101, and the fit-on recess 107 of the abutment plate 95 is formed with a narrow slot 113 continuous with the narrow slit 111 identical to the narrow slit 111 in width and extending radially outwardly beyond the slit 111 on a position opposed to the opening portion 105.

Each of the guide plates 101, 101 is formed so as to extend for entire length of the fit-on portion 97 in an axial direction, and at the same time radially outwardly up to a position of an radially outer edge of the abutment plate 95, and integrally connected to one end surface of the abutment plate 95 at the other end thereof. A corner portion between one end and radially outer end of the guide plate 101 is configured in curved line, curved surface bulging outwardly or slant surface. Further, each of the guide plates 101, 101 is formed so that a distance between radially outer ends thereof is somewhat longer than a distance between bottom surfaces of a pair of the recessed engagement guides 55, 55 formed in an inner surface of the retainer holding portion 25 of the connector housing 3, and a thickness of the guide plate 101 is designed generally identical to a width of the recessed engagement guide 55 at the narrowest portion thereof.

An outer peripheral surface of the abutment plate 95 is formed with a pair of notch-like recesses 115, 115 with the narrow slot 113 therebetween on diametrically symmetrical positions with respect to the opening portion 105. That is, the stop and verification arm 99 is formed integrally on a portion between the notch-like recesses 115, 115 at radially outer end portion thereof. The stop and verification arm 99 is disposed in a center position between a pair of the guide plates 101, 101. The stop and verification arm 99 is provided with a hook portion 117 (engaging portion) on a radially inner side of one end portion. An axial length of the stop and verification arm 99, namely an axial distance from one end surface of the abutment plate 95 to an engagement surface 119 of the hook portion 117 is designed generally identical to an axial distance from the other end of the connector housing 3 to the other end of the engagement window 49.

And, each of the abutment fingers 103, 103 is configured so that an axial distance from the one end surface of the abutment plate 95 to one end of the abutment finger 103 is generally identical to an axial distance from the other end of the connector housing 3 to a position somewhat toward the other end of the retainer holding portion 25 with respect to the annular stepped end surface 45, that is an axial distance from the other end of the connector housing 3 to a position slightly toward the other end of the retainer 5 with respect to the engagement slit 79 with which the first pipe 65 is snap-engaged.

As well shown in FIG. 8, the first connection verifying device 91 is mounted on an assembled unit of the first quick connector 1 and the first pipe 65 in a following manner. First, the abutment plate 95 and the fit-on portion 97 are fitted via the opening portion 105 and the opening portion 109 on an outer periphery of the straight tubular inserting side portion 87 of the first pipe 65 which extends axially outwardly or in the other axial direction from the other end of the first quick connector 1 so that the inserting side portion 87 of the first pipe 65 is snap-fitted in the fit-on recess 107 of the abutment plate 95 and the fit-on portion 97, namely is fitted in the fit-on recess 107 and the fit-on portion 97 in locked relation by the opening portions 105, 109 (refer to FIG. 8a). Although width of the opening portion 105 of the abutment plate 95 and the opening portion 109 of the fit-on portion 97 is configured slightly smaller than an outer diameter of the first pipe 65, the notch-like recesses 115, 115 and the narrow slot 113 formed in the abutment plate 95, and the narrow slit 111 formed in the fit-on portion 97 allow the abutment plate 95 and the fit-on portion 97 to readily deform so as to open when the first connection verifying device 91 is fitted on the first pipe 65. After the first connection verifying device 91 is fitted on an outer periphery of the inserting side portion 87 of the first pipe 65, the first connection verifying device 91 is slid and moved over the inserting side portion 87 of the first pipe 65 in one axial direction toward the first quick connector 1 until the one end surface of the abutment plate 95 abuts the other end of the first quick connector 1 or the connector housing 3 (refer to FIG. 8b).

Figure 9:
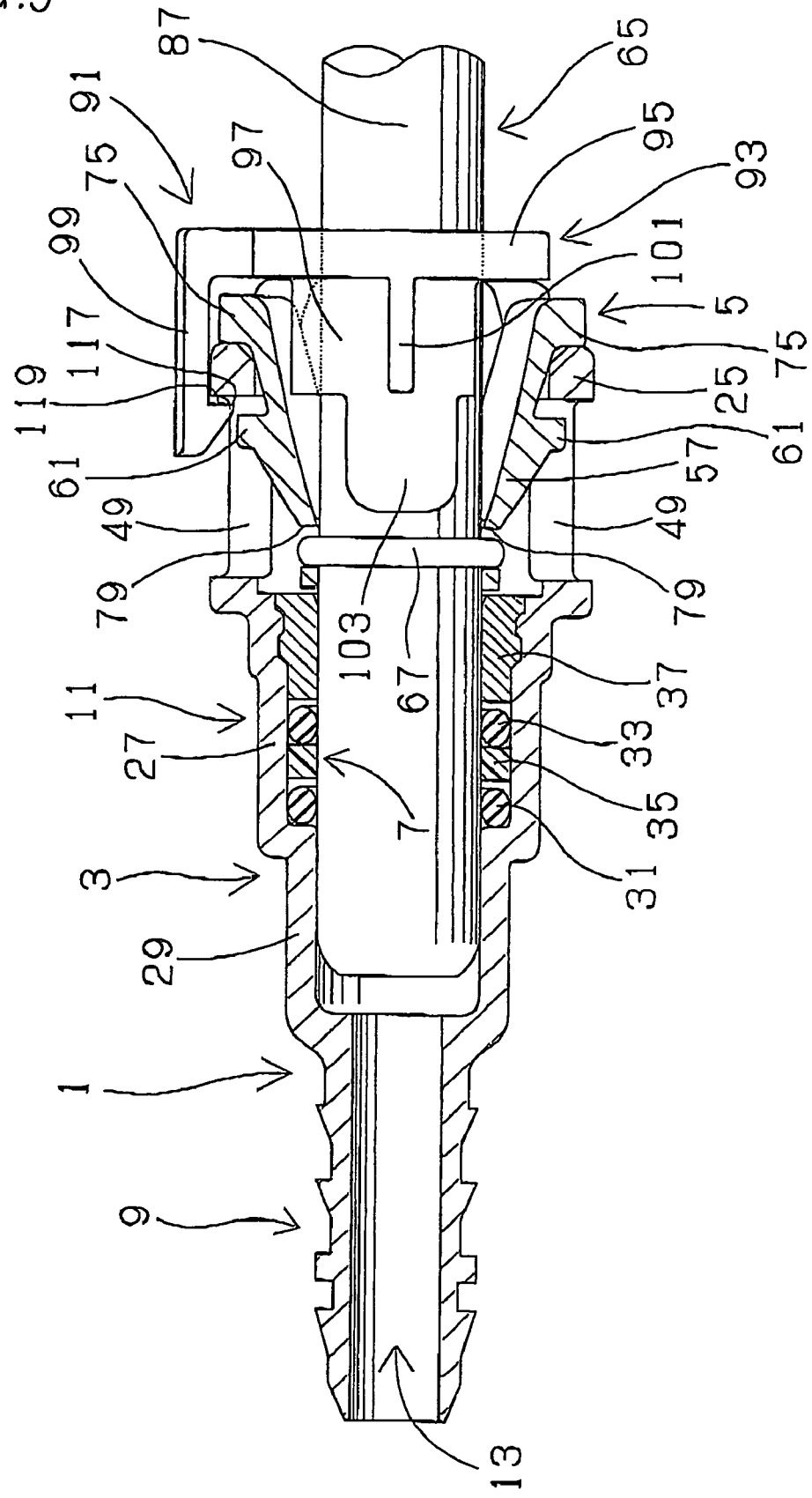
FIG. 9 is a sectional view of the first connection verifying structure.
Figure 10:
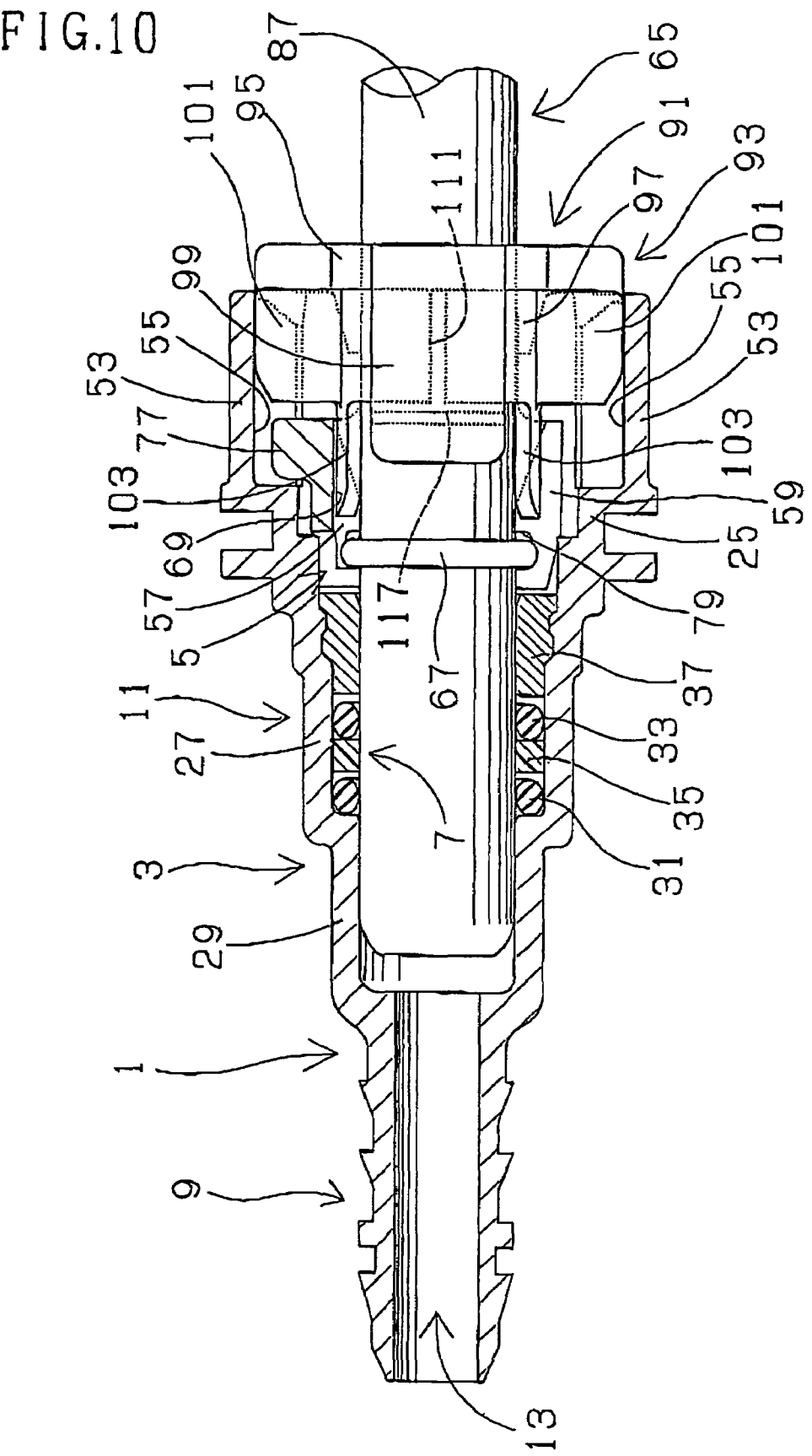
FIG. 10 is another sectional view of the first connection verifying structure.

As understood with reference to FIGS. 9 and 10, as the first connection verifying device 91 progresses or moves forward, the fit-on portion 97 and the abutment fingers 103, 103 are to be received or inserted in the retainer holding portion 25 of the connector housing 3 accordingly. In preparation for the fit-on portion 97 to be received, the fit-on portion 97 is adjusted relative to the retainer holding portion 25 so that the guide plates 101, 101 correspond in position to the recessed engagement guides 55, 55 formed in an inner peripheral surface of the retainer holding portion 25. As a distance between radially outer ends of the guide plates 101, 101 is slightly longer than a distance between bottom surfaces of the recessed engagement guides 55, 55, each of the guide plates 101, 101 seats in the recessed engagement guide 55 so as to closely contact or somewhat press the fit-on recess 107 of the abutment plate 93 and an inner surface of the fit-on portion 97 against an outer peripheral surface of the inserting end portion 89 of the first pipe 65, therefore so as to approach, closely contact or press the abutment finger 103 against an outer peripheral surface of the first pipe 65, and progresses or moves forward in one axial direction in the recessed engagement guide 55. As a guide surface is defined on a corner portion between one end and radially outer end of the guide plate 101, the guide plate 101 is smoothly guided in the recessed engagement guide 55. The abutment finger 103 is formed in cross-sectional shape curved so as to swell radially outwardly at curvature generally identical to an outer peripheral surface of the inserting side portion 87 of the first pipe 65. The configuration such that a pair of the guide plates 101, 101 seat in the recessed engagement guides 55, 55 prevents that the first connection verifying device 91 is fitted to the connector housing 3 with turned by 90 degrees.

Then the one end surface of the abutment plate 95 is abutted to the other end of the connector housing 3, the hook portion 117 or the engagement surface 119 of the hook portion 117 of the stop and verification arm 99 is engaged with the other end of the engagement window 49 (stop portion). In this manner, the first connection verifying device 91 is completely mounted and thereby the first connection verifying structure is configured. The first connection verifying device 91 is mounted on the assembled unit of the first quick connector 1 and the first pipe 65 so as not to be displaced with respect to the first quick connector 1 in the other axial direction by engagement of the hook portion 117 of the stop and verification arm 99 with the engagement window 49. When the first connection verifying device 91 is mounted on the assembled unit, the fit-on portion 97 is received in the retainer holding portion 25 on the other end of the retainer 5 with respect to the main body 57, while the abutment fingers 103, 103 are received between circumferentially opposite ends 59, 59 and in the recessed inner surface 69 (in a recess including the recessed inner surface 69) of the main body 57 respectively.

One end of the abutment finger 103 is located slightly toward the other axial direction from the annular engagement projection 67 of the first pipe 65 between the circumferential end portions 59, 59 of the main body 57 and in a position of the indent 71 of the main body 57 (in circumferential position of the indent 71), and restrains the annular engagement projection 67 of the first pipe 65 from escaping out of the engagement slit 79 of the retainer 5.

Figure 11:
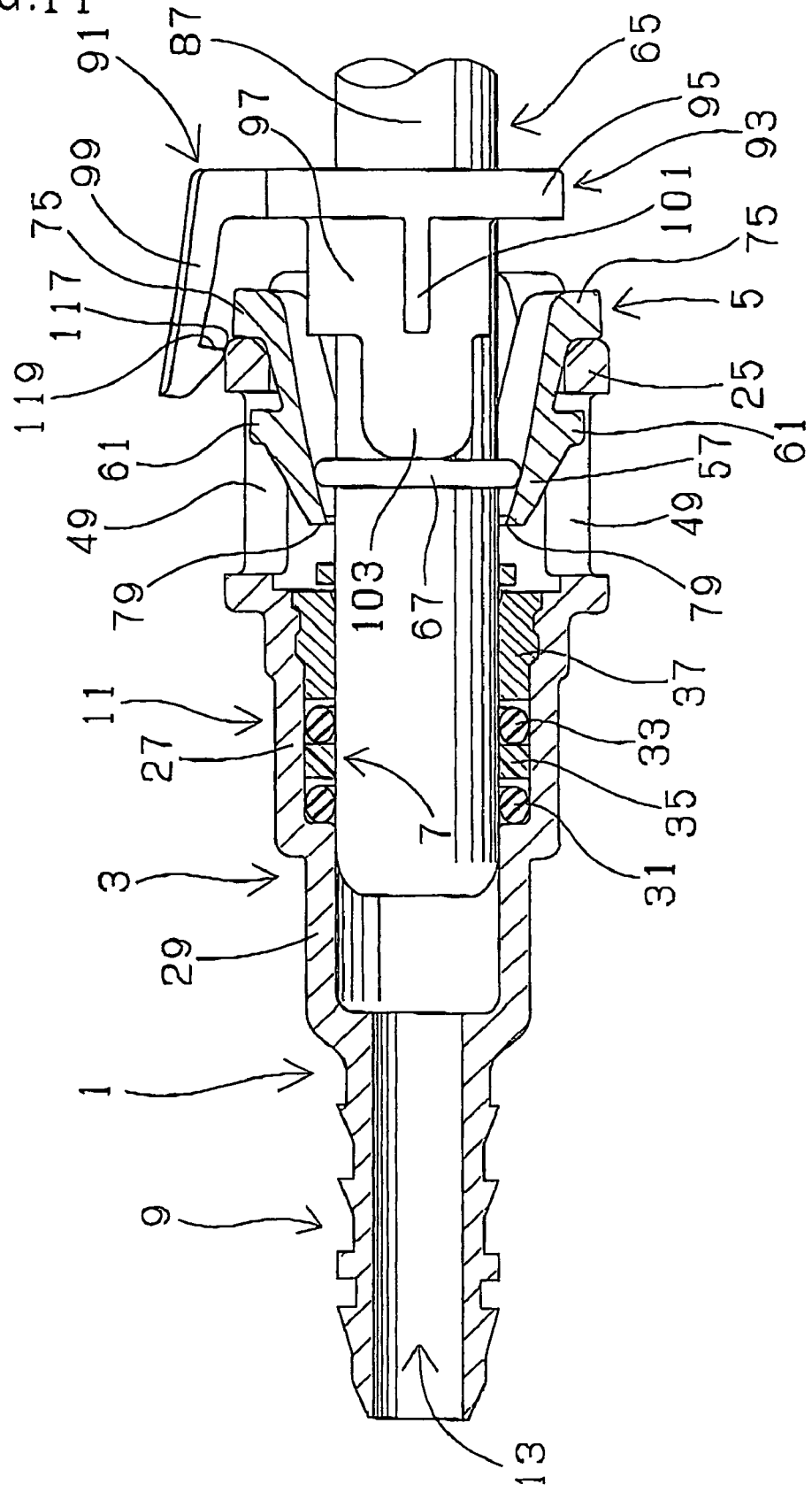
FIG. 11 is a view showing that the first connection verifying device is mounted when the first quick connector and the first pipe are in half-fitting relation.

If the annular engagement projection 67 of the first pipe 65 does not snap-engage in the engagement slit 79 of the retainer 5 and is in so-called incomplete fitting or half fitting state, one end of the abutment finger 103 abuts the annular engagement projection 67 which is located in the other end with respect to the engagement slit 79, as shown in FIG. 11, before the hook portion 117 of the stop and verification arm 99 is engaged with the other end of the engagement window 49. At that time, if the first connection verifying device 91 is pushed forcibly or relatively forcibly in one axial direction, the annular engagement projection 67 is moved relatively in one axial direction and finally snap-engages in the engagement slit 79 of the retainer 5, and the hook portion 117 of the stop and verification arm 99 is engaged with the other end of the engagement window 49. However, if the hook portion 117 of the stop and verification arm 99 cannot be engaged with the other end of the engagement window 49 by pushing or pulling forcibly the first connection verifying device 91 in one axial direction, the first pipe 65 is forcibly pushed in the connector housing 3 or the first quick connector 1 is forcibly pushed so that the first pipe 65 is accommodated in the connector housing 3, and then again the first connection verifying device 91 is pushed or pulled in one axial direction. The hook portion 117 which is successfully engaged with the other end of the engagement window 49 indicates that the first pipe 65 is correctly connected to the connector housing 3.

By the way, in order that the abutment finger 103 does not happen to abut the annular engagement projection 67 of the first pipe 65 while the first pipe 65 is correctly connected, the abutment finger 103 is formed such that one end thereof is located slightly toward the other end with respect to the engagement slit 79 (a connection engageable portion) or the annular engagement projection 67 of the first pipe 65 which is engaged with the engagement slit 79. However, the abutment finger 103 should be configured to relatively positively push the annular engagement projection 67 into the engagement slit 79 when the first pipe 65 and the first quick connector 1 are in incomplete fitting relation. The annular engagement projection 67 is usually formed with a radially outer end of semi-circular or arc-shape in cross-section, and progresses or moves toward the engagement slit 79 while expanding radially outwardly the main body 57 of the retainer 5 in the retainer holding portion 25. And, when a center portion in thickness direction of the annular engagement projection 67 moves beyond the other end of the engagement slit 79, the main body 57 of the retainer 5 is reduced in diameter, while displaced slightly toward the other axial direction, due to resilient restoration action as a gap is defined between the engagement tab 61 and the engagement window 49, and consequently the annular engagement projection 67 seats in the engagement slit 79. Therefore, an axial direction between one end of the abutment finger 103 and the engagement slit 79 (an connection engageable portion) or the annular engagement projection 67 of the first pipe 65 engaged with the engagement slit 79 is designed equal to or shorter than one half of a thickness of the annular engagement projection 67. This configuration allows to snap-engage the annular engagement projection 67 of the first pipe 65 smoothly with the engagement slit 79.

In case that the first pipe 65 is securely fixed, the first quick connector 1 is fitted to the first pipe 65 securely fixed, or the first pipe 65 securely fixed is relatively inserted in the first quick connector 1, the first connection verifying device 91 is, for example, fitted or mounted to the first quick connector 1 in the following manner. First, the first connection verifying device 91 is fitted on an outer peripheral surface of the inserting side portion 87 of the first pipe 65 and slid thereover in one axial direction until one end of the abutment finger 103 somewhat enters the retainer holding portion 25 of the connector housing 3 via the opening 85 of the connector housing 3. Then, the first connection verifying device 91 is pulled toward the first quick connector 1 or pulled so that the abutment plate 95 and the first quick connector 1 approach each other, and thereby the hook portion 117 of the stop and verification arm 99 is engaged with the other end of the engagement window 49. When the first pipe 65 and the first quick connector 1 are in incomplete fitting relation or half-fitting relation, if the first connection verifying device 91 is pulled or attracted toward the first quick connector 1 or the abutment plate 95 and the first quick connector 1 are moved close to each other, the annular engagement projection 67 of the first pipe 65 is moved relatively in one axial direction in the retainer 5 and then snap-engaged with the engagement slit 79.

In the event of removing the first connection verifying device 91 from the assembled unit of the first quick connector 1 and the first pipe 65, first, engagement of the hook portion 117 of the stop and verification arm 99 with the engagement window 49 is released, and then the first connection verifying device 91 is pulled out of the retainer holding portion 25 of the connector housing 3. The first connection verifying device 91 which is removed may be again fitted to the assembled unit of the first quick connector 1 and the first pipe 65.

As shown with chain double-dashed lines in FIG. 8, a strip or strap 121 for combining purpose may be fitted to an outer periphery of the retainer holding portion 25 at one end portion thereof and to the stop and verification arm 99 at the other end portion thereof so as to always keep the first quick connector 1 and the first connection verification device 91 in combination relation with one another. The strap 121 is fitted on an outer periphery of the retainer holding portion 25, for example, by way of a raised or recessed portion formed on the retainer holding portion 25 for purpose of an additional function or the like, for example, an elongate rib 123.

A second connection verifying structure for a pipe and a connector according to the present invention is explained with reference to FIGS. 12 to 15.

Figure 12:
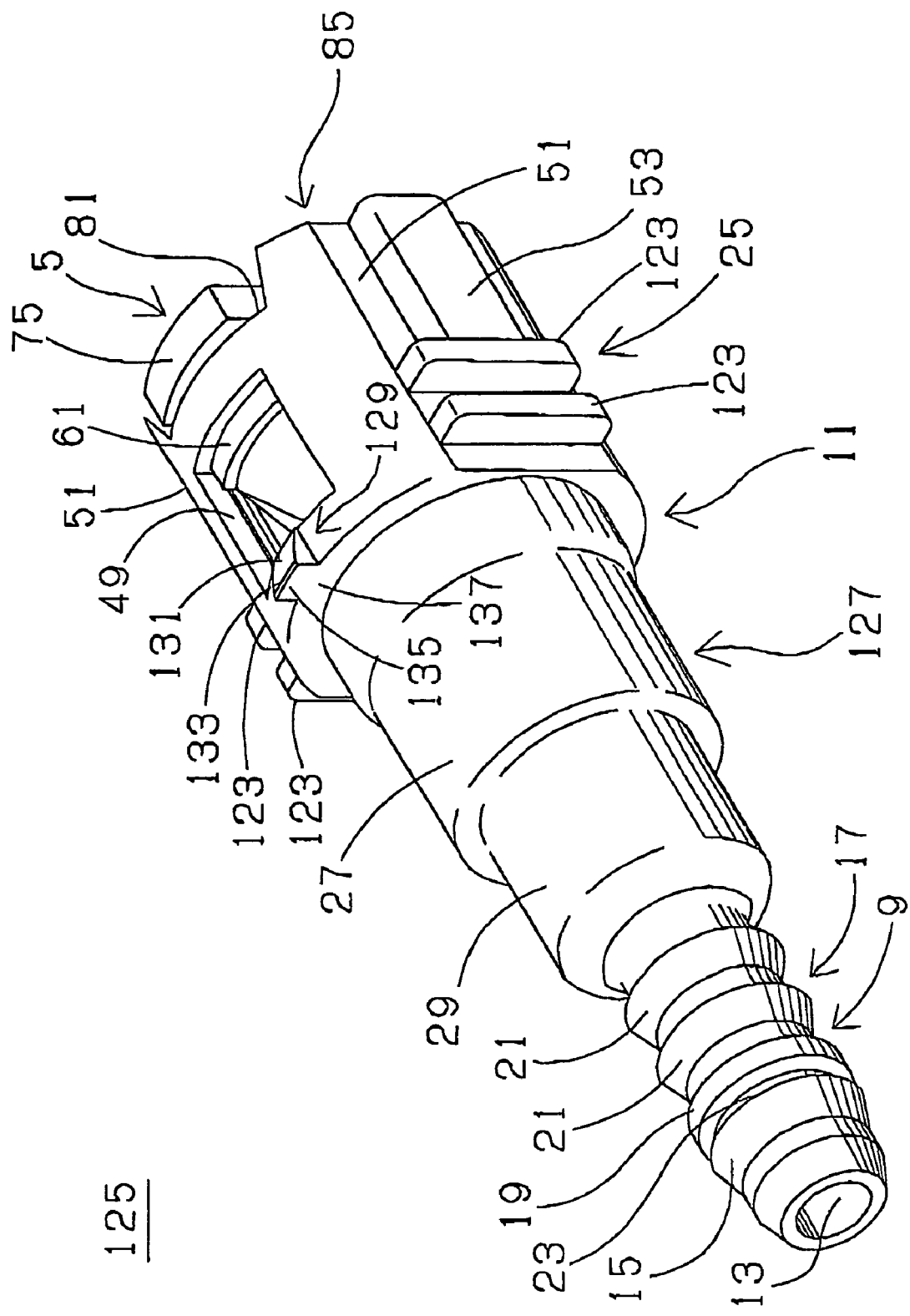
FIG. 12 is a perspective view of a second quick connector to be adapted in a second connection verifying structure for a pipe and a connector according to the present invention.
Figure 14:
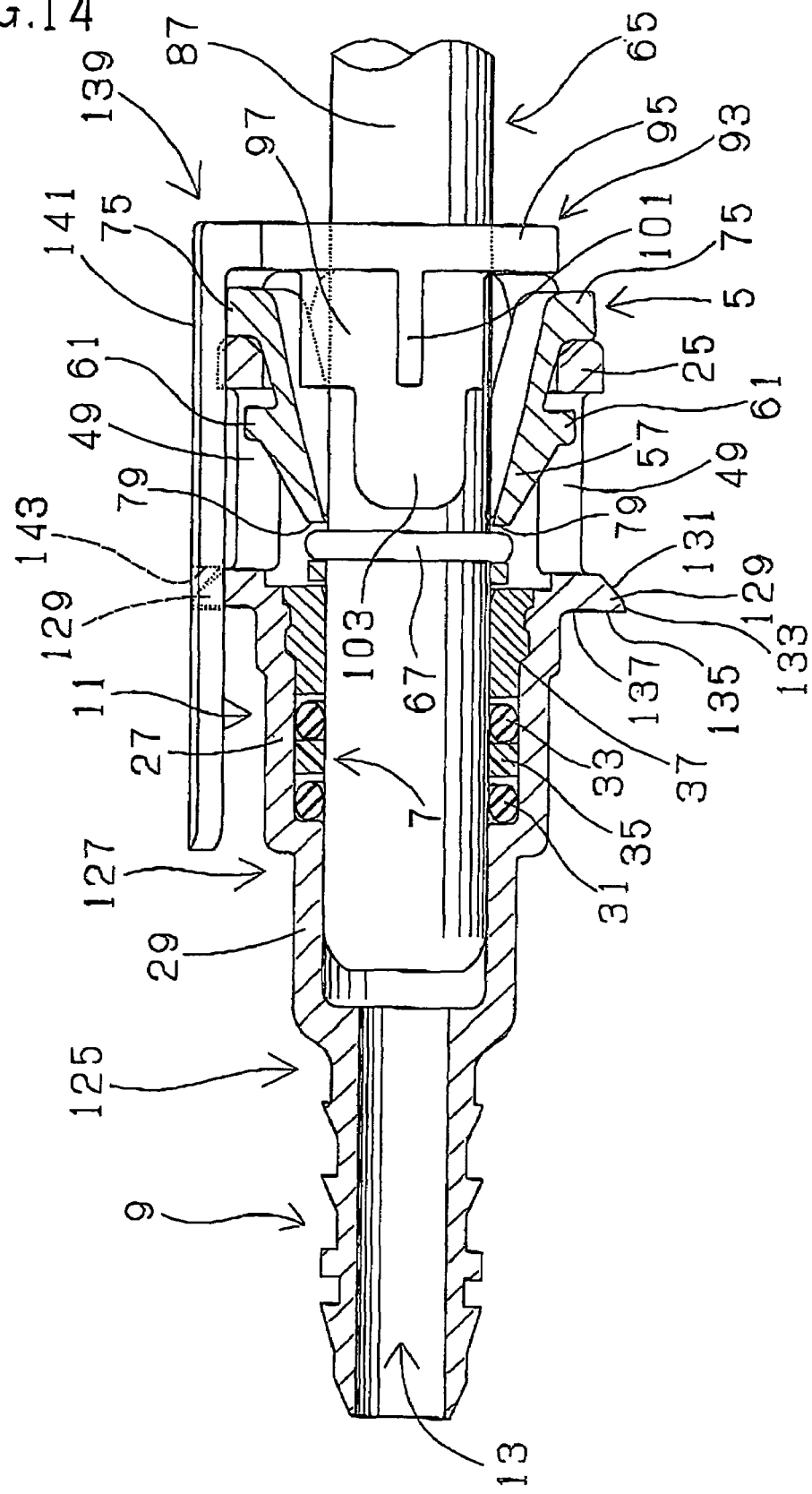
FIG. 14 is a sectional view of the second connection verifying structure.

The second quick connector 125 which is adapted in a second connection verifying structure, for example, made of resin, as well shown in FIGS. 12 and 14, has a modified configuration with respect to the connector housing 3 of the first quick connector 1. Therefore, as to portions of configuration and functions identical to the first quick connector 1, identical numeral references are almost given and explanations are almost omitted herein. The retainer holding portion 25 of the connector housing 127 is provided integrally with engagement protrusions 129, 129 (stop portion) between one end thereof and the engagement windows 49, 49 on an outer peripheral surface thereof respectively. Each of the engagement protrusions 129, 129 includes a radially outer surface defined by a ramped outer surface 131 and a slide outer surface 133. The ramped outer surface 131 extends inclining radially outwardly from one end of the engagement window 49 in one axial direction, and the slide outer surface 133 extends short from one end of the ramped outer surface 131 in one axial direction. The engagement protrusion 129 further includes an engagement outer surface 135 extending radially inwardly from one end of the slide outer surface 133 and is continuous with an outer end surface 137 of one end of the retainer holding portion 25. The engagement outer surface 135 is coplanar with the outer end surface 137 of one end of the retainer holding portion 25. The radially outer surface of the engagement protrusion 129 is formed in arc swelling radially outwardly in cross-section taken perpendicular to an axis.

Figure 13:
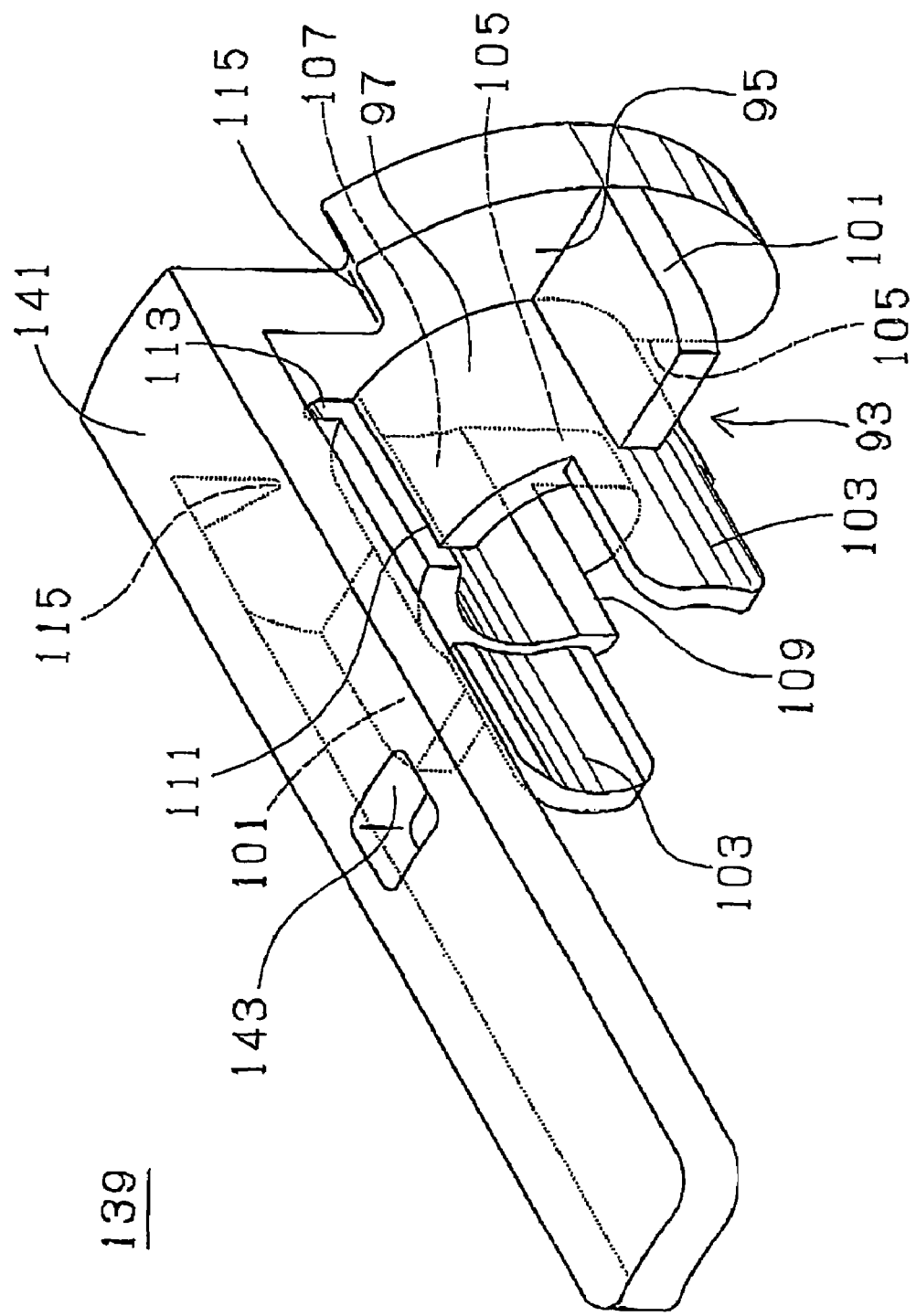
FIG. 13 is a perspective view of the second connection verifying device for a pipe and a connector to be adapted in the second connection verifying structure.

A second connection verifying device 139 for a pipe and a connector, which is adapted in the second connection verifying structure, for example, made of resin, is configured by modifying the stop and verification arm 99 of the first connection verifying device 91. As shown in FIG. 13, in the second connection verifying device 139, a stop and verification arm 141 (verification means) extends long from an outer periphery of the abutment plate 95 in one axial direction, is formed with an engageable hole 143 (engaging portion) bored through radially on an axial center portion thereof. An axial distance from one end surface of the abutment plate 95 to one end of the engageable hole 143 is designed generally identical to an axial distance from the other end of the connector housing 127 to the engagement outer surface 135 of the engagement protrusion 129. A radially inner surface of the stop and verification arm 141 is formed in arc recessed or concaved radially outwardly in cross-section taken perpendicular to an axis so as to correspond to a radially outer surface 137 of the engagement protrusion 129 and an outer peripheral surface of the retainer holding portion 25. Other configuration of the stop and verification arm 141 is generally identical to that of the stop and verification arm 99.

As well shown in FIG. 14, the second connection verifying device 139 is mounted to an assembled unit of the second quick connector 125 and the first pipe 65 to construct the second connection verifying structure in a following manner. Just like the first connection verifying device 91, first, the abutment plate 95 and the fit-on portion 97 are fitted on an outer periphery of the straight tubular inserting side portion 87 of the first pipe 65. Then the second connection verifying device 139 is slid and moved over the inserting side portion 87 of the first pipe 65 in one axial direction toward the second quick connector 125 until one end surface of the abutment plate 95 abuts the other end of the second quick connector 125 or the connector housing 127 so that the engagement protrusion 129 is engaged in the engageable hole 143 of the stop and verification arm 141. In process of mounting the second connection verifying device 139, as the second connection verifying device 139 is moved in one axial direction, one axial end of the stop and verification arm 141 contacts or abuts the ramped outer surface 131 of the engagement protrusion 129. As the second connection verifying device 137 is moved further in one axial direction, one end of the stop and verification arm 141 is guided by the ramped outer surface 131 and progresses along the ramped outer surface 131, then a radially inner surface of the stop and verification arm 141 contacts the slide outer surfaces 133 or the other end of the slide outer surfaces 133. And, the stop and verification arm 141 is further relatively slid and moved over the slide outer surfaces 133 or the other end thereof until the second connection verifying device 137 is completely mounted to the assembled unit of the second quick connector 125 and the first pipe 65. However, the stop and verification arm 141 is configured so that one end thereof extends long beyond the engagement protrusion 129. Thereby engagement between the engageable hole 143 and the engagement protrusion 131 is easily released by moving the stop and verification arm 141 so as to lift up one end portion thereof radially outwardly.

Figure 15:
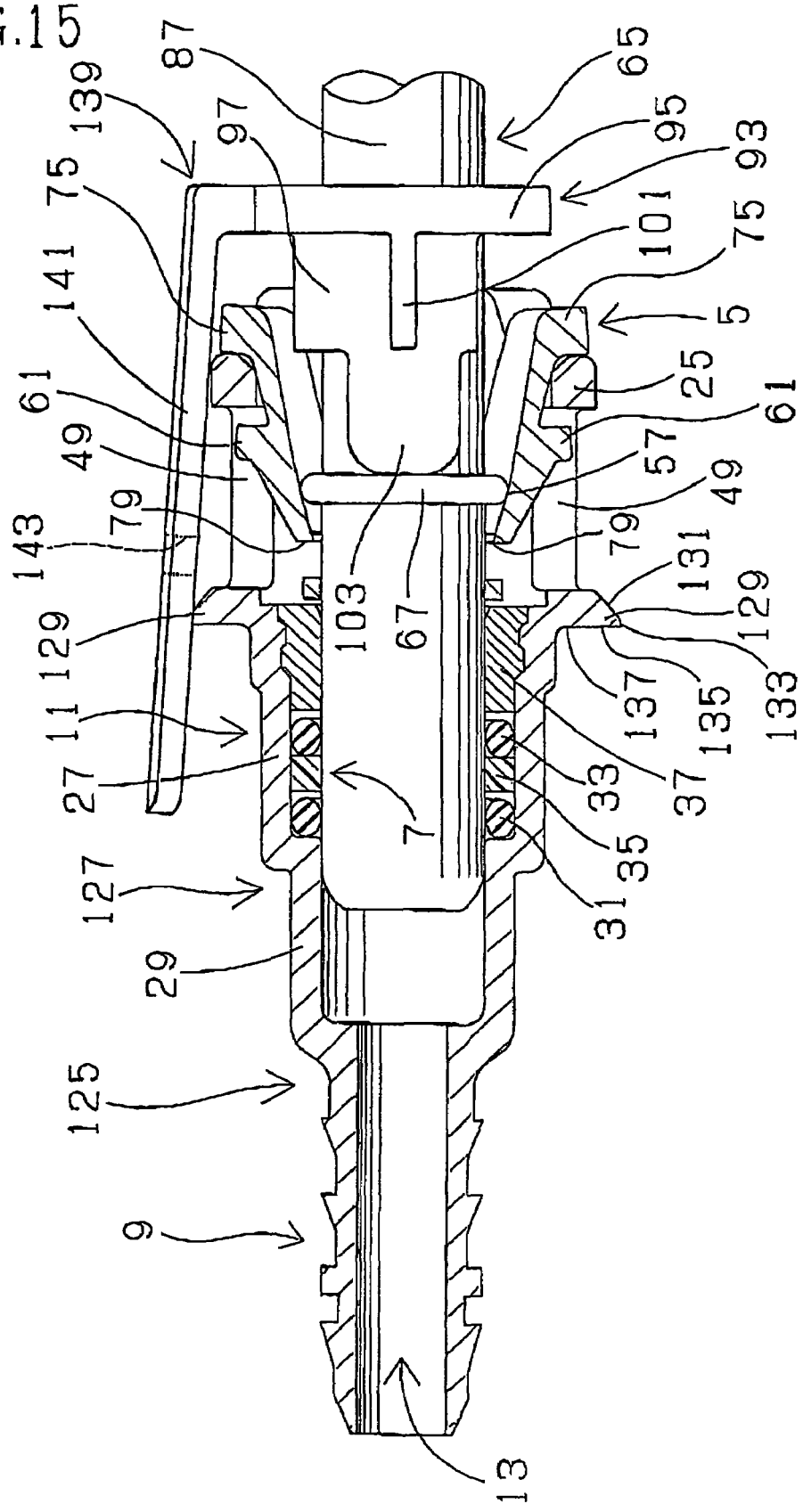
FIG. 15 is a view showing the second connection verifying device is mounted when the second quick connector and the first pipe are in half-fitting relation.

If the annular engagement projection 67 of the first pipe 65 does not snap-engage in the engagement slit 79 of the retainer 5 is in so-called incomplete fitting or in half fitting state, one end of the abutment finger 103 abuts the annular engagement projection 67 which is located in the other end with respect to the engagement slit 79, as shown in FIG. 15, before the engagement protrusion 129 is engaged with the engageable hole 143 of the stop and verification arm 141. At that time, if the second connection verifying device 139 is pushed or pulled forcibly or relatively forcibly in one axial direction, the annular engagement projection 67 is moved relatively in one axial direction and finally snap-engages in the engagement slit 79 of the retainer 5, and the engagement protrusion 129 is engaged with the engageable hole 143 of the stop and verification arm 141. However, if the engagement protrusion 129 cannot be engaged with the engageable hole 143 of the stop and verification arm 141 by pushing or pulling forcibly the second connection verifying device 139 in one axial direction, the first pipe 65 is forcibly pushed in the connector housing 127 or the second quick connector 125 is forcibly pushed so that the first pipe 65 is accommodated in the connector housing 127, and then again the second connection verifying device 139 is pushed or pulled in one axial direction. The engagement protrusion 129 which is successfully engaged with the engageable hole 143 of the stop and verification arm 141 indicates that the first pipe 65 is correctly connected to the connector housing 127.

The second connection verifying device 139 can be mounted to the assembled unit of the first pipe 65 securely fixed and the second quick connector 125 in similar manner to the first connection verifying device 91. The second connection verifying device 139 also has a stop function with respect to the first pipe 65 similar to the first connection verifying device 91.

A third connection verifying structure for a pipe and a connector according to the present invention is explained with reference to FIGS. 16 to 22.

Figure 16:
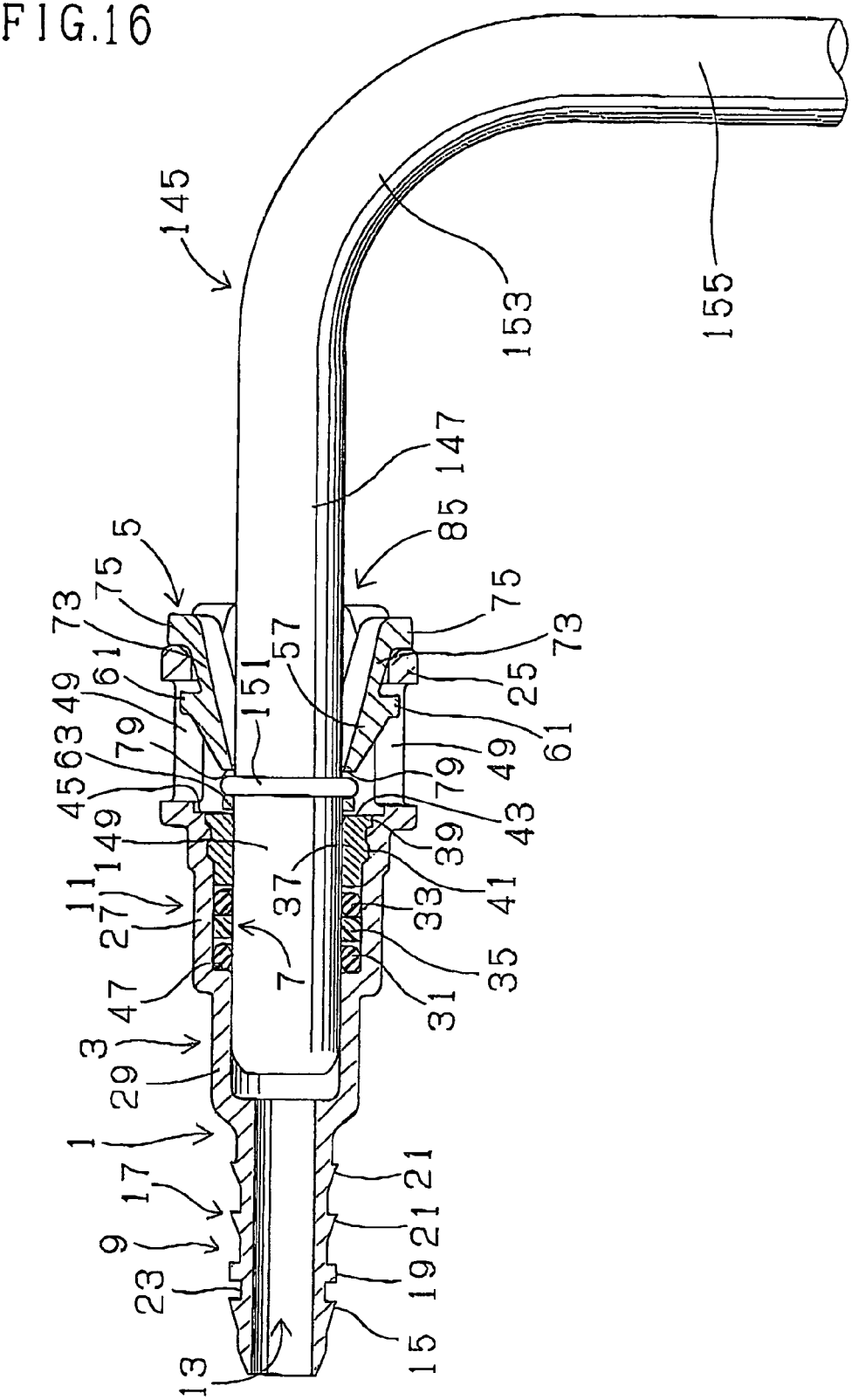
FIG. 16 is a view showing a second pipe connected to the first quick connector to construct a third connection verifying structure for a pipe and a connector according to the present invention.
Figure 17:
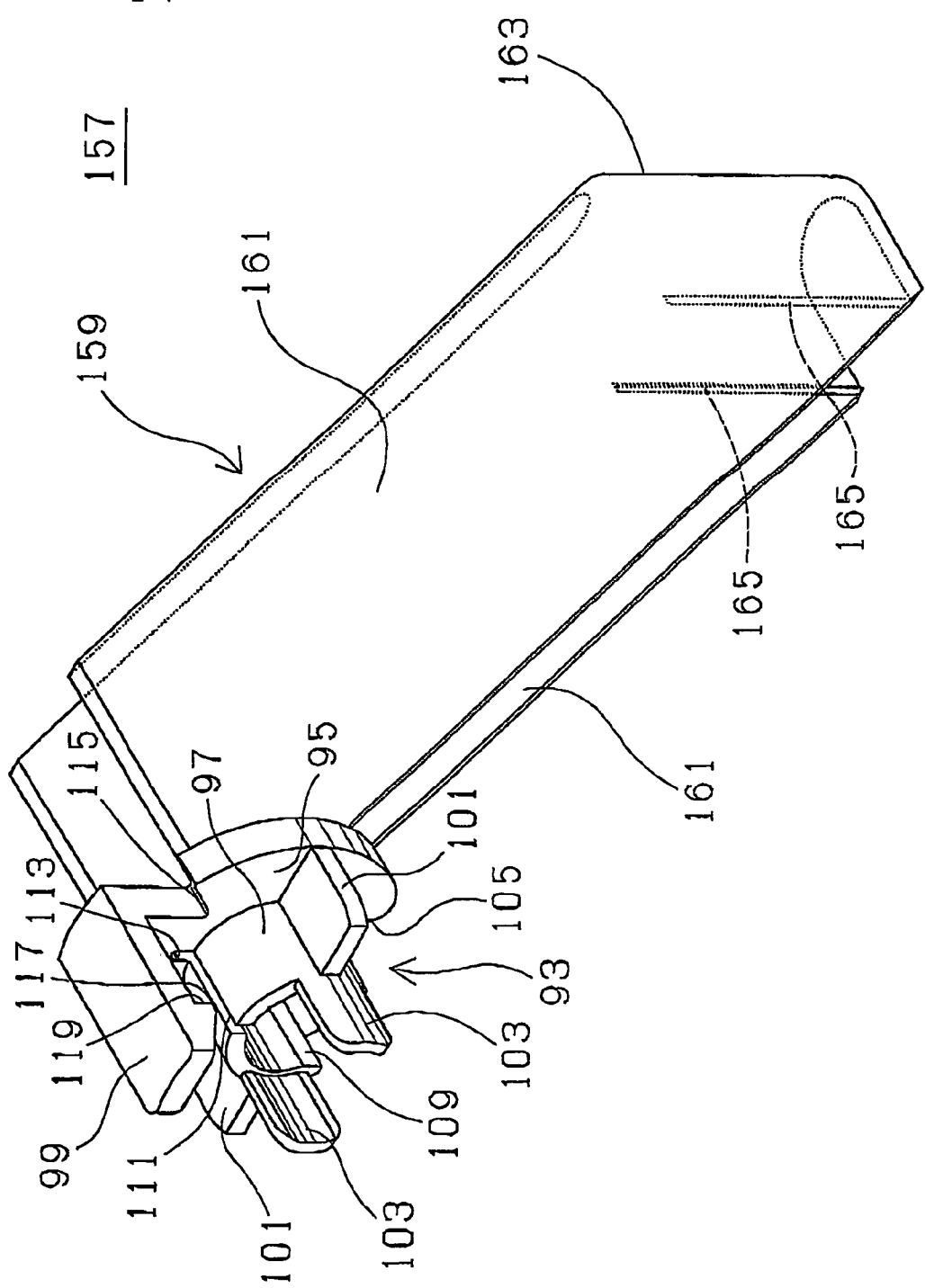
FIG. 17 is a perspective view of a third connection verifying device for a pipe and a connector to be adapted in the third connection verifying structure.
Figure 18:
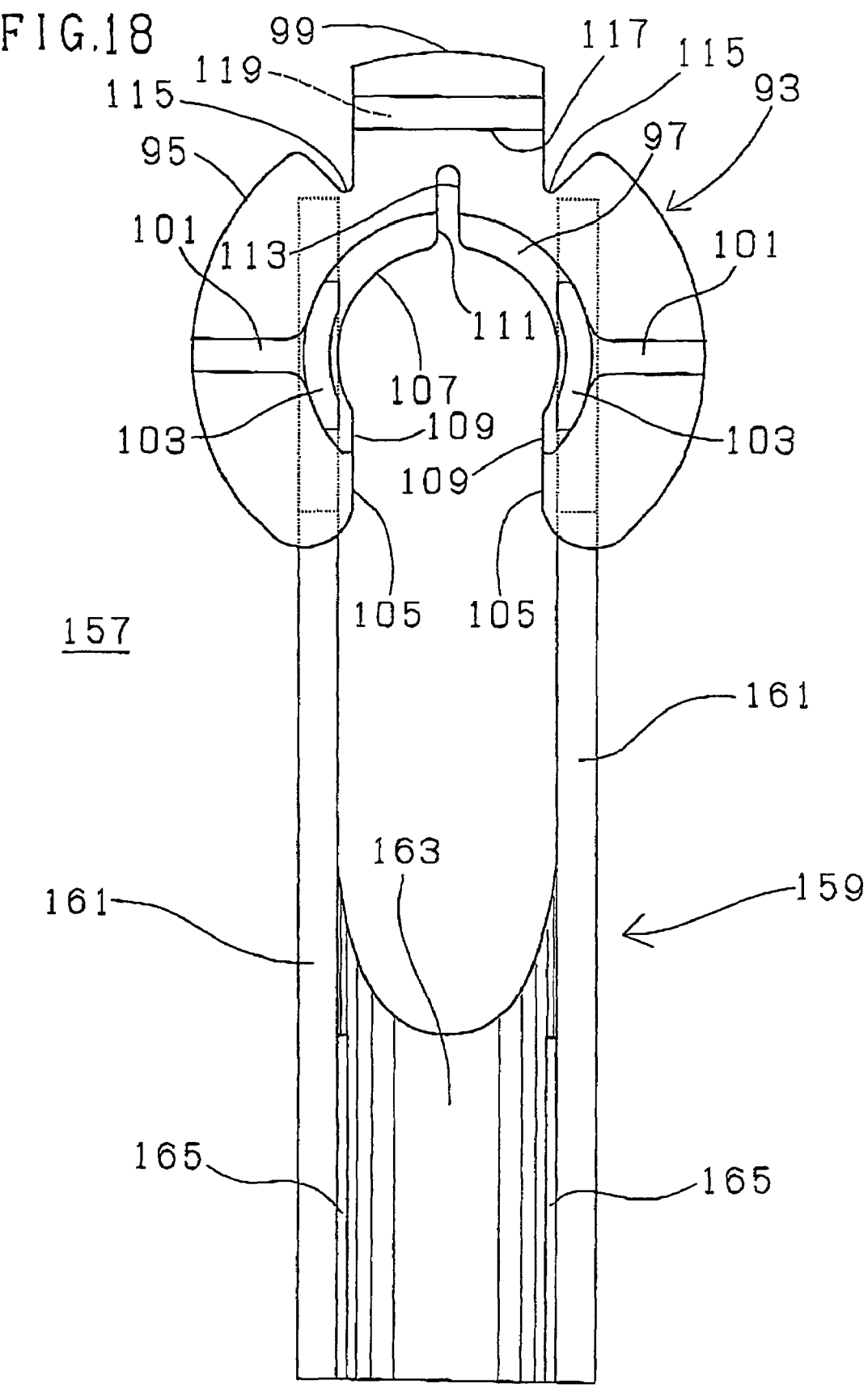
FIG. 18 is a side elevation of the third connection verifying device.

A second pipe 145 which is adapted in the third connection verifying structure is, for example, made of metal, as well shown in FIG. 16, inserted in the first quick connector 1 via the opening 85 of the retainer holding portion 25, more specifically, in the main body 57 of the retainer 5 from a side of the latching ends 75, 75 of the operation arms 73, 73, and is fitted in the first quick connector 1. The second pipe 145 has an inserting side portion 147 of straight tubular shape. One end of the inserting side portion 147 is configured as inserting end portion 149 which is provided with an annular engagement projection 151 on an outer peripheral surface thereof. The second pipe 145 further has integrally a bent portion 153 formed on the other end with respect to or the other end of the inserting side portion 147 and an extending portion 155 extending from the bent portion 153. The bent portion 153 is formed so as to be bent at an right angle or generally right angle with respect to the inserting side portion 147. The bent portion 153 and the extending portion 155 define a bent portion side. The second pipe 145 is relatively pushed, and fittingly inserted into the first quick connector 1 or the connector housing 3 so that the annular engagement projection 151 relatively progresses or moves forward radially expanding the main body 57 or an inner surface of the main body 57 of the retainer 5 until the annular engagement projection 151 seats in the engagement slits 79, 79 in snap-engagement relation therewith and the inserting end portion 149 is accommodated an entire length thereof in the pipe inserting portion 11 of the connector housing 3. One end of the inserting end portion 149 of the second pipe 145 reaches in the link portion 29 through the second O-ring 33 and the first O-ring 31, and thereby a seal is formed by the first and second O-rings 31, 33 between an outer periphery surface of the second pipe 145 or the inserting end portion 149 of the second pipe 145 and an inner peripheral surface of the first quick connector 1. Inner diameters of the resin bush 37 and the link portion 29 are generally identical to an outer diameter of the inserting end portion 149 of the second pipe 145, and one end of the inserting end portion 149 with respect to the annular engagement projection 151 is inserted in the resin bush 37 and the link portion 29 substantially without play. A configuration of the inserting side portion 147 of the second pipe 145 is identical to that of the inserting side portion 87 of the first pipe 65.

A third connection verifying device 157 for a pipe and a connector, which is adapted in the third connection verifying structure, for example, made of resin, is configured by modifying the first connection verifying device 91. That is, the third connection verifying device 157 is configured by adding another construction to the first connection verifying device 91. Therefore, as to portions of configuration and functions identical to the first connection verifying device 91, identical numeral references are almost given and explanations are almost omitted herein.

The third connection verifying device 157 further comprises an clip arm 159. The clip arm 159 comprises a pair of clip plates 161, 161 (clip members) which are connected integrally to the other end surface of the abutment plate 95 on one ends thereof and extend from the abutment plate 95 in the other axial direction, parallel with one another at a distance therebetween generally identical to an outer diameter of the second pipe 145. A pair of the clip plates 161, 161 have a continuous portion 163 at the other end portions thereof to connect the other end portions integrally with each other. The clip plates 161, 161 are connected to the abutment plate 95 at one ends thereof so as to contact to diametrically symmetrical positions of the fit-on recess 107 with the stop and verification arm 99 therebetween. An outer edge or one widthwise end of each clip plate 161 on a side of the stop and verification arm 99 is formed so as to extend in the other axial direction along an axis and then extend in the other axial direction at an angle of about 45° in a direction opposite to the stop and verification arm 99. An inner edge or the other widthwise end of each clip plate 161 on a side far from the stop and verification arm 99 is formed to extend in the other axial direction at an angle of about 45° immediately from the other end surface of the abutment plate 95 in a direction opposite to the stop and verification arm 99 and then extend in the other axial direction along an axis or in parallel with an axis on portion thereof. The continuous portion 163 is formed so as to extend in a direction perpendicular to an axis, and an axial length of the clip arm 159 is designed so that the continuous portion 163 is located somewhat toward the other end with respect to the extending portion 155 or the bent portion side of the second pipe 145 when the second pipe 145 is connected to the first quick connector 1 and the body portion 93 of the third connection verifying device 157 is mounted to the first quick connector 1.

An inner surface of each clip plate 161 is formed with snap ribs 165, 165 projecting on one end with respect to the continuous portion 163 so as to extend parallel with the continuous portion 163. The snap rib 165 is designed so as to be located somewhat in one end of the second pipe 145 with respect to the extending portion 155 when the second pipe 145 is connected to the first quick connector 1 and the body portion 93 of the third connection verifying device 157 is mounted or fitted to the first quick connector 1.

As well shown in FIG. 19, the third connection verifying device 157 is mounted to an assembled unit of the first quick connector 1 and the second pipe 145 to construct the third connector verifying structure in a following manner. First, the abutment plate 95 and the fit-on portion 97 are fitted via the opening portion 105 and the opening portion 109 on an outer periphery of the straight tubular inserting side portion 147 (a portion formed on one end with respect to the bent portion 153) of the second pipe 145 which extends axially outwardly or in the other axial direction from the other end of the first quick connector 1 so that the bent portion 153 or the bent portion side enters between the clip arm 159 or the clip plates 161, 161 (refer to FIG. 19a). Thereby the inserting side portion 147 of the second pipe 145 is snap-fitted in the fit-on recess 107 of the abutment plate 95 and the fit-on portion 97, namely is fitted in the fit-on recess 107 and the fit-on portion 97 in locked relation by the opening portions 105 and 109. That is, the abutment plate 95 and the fit-on portion 97 are fitted on the second pipe 145 from a side opposite to the extending portion 155. Although a width of the opening portion 105 of the abutment plate 95 and the opening portion 109 of the fit-on portion 97 is designed slightly smaller than an outer diameter of the second pipe 145, the notch-like recesses 115, 115 and the narrow slot 113 formed in the abutment plate 95, and the narrow slit 111 formed in the fit-on portion 97 allow the abutment plate 95 and the fit-on portion 97 to readily deform so as to open when the third connection verifying device 157 is mounted or fitted on the second pipe 145. After the third connection verifying device 157 is fitted on an outer periphery of the inserting side portion 147 of the second pipe 145, the third connection verifying device 157 is slid and moved over the inserting side portion 147 of the second pipe 145 in one axial direction toward the first quick connector 1 until the one end surface of the abutment plate 95 abuts the other end of the first quick connector 1 or the connector housing 3 (refer to FIG. 19b).

Figure 22:
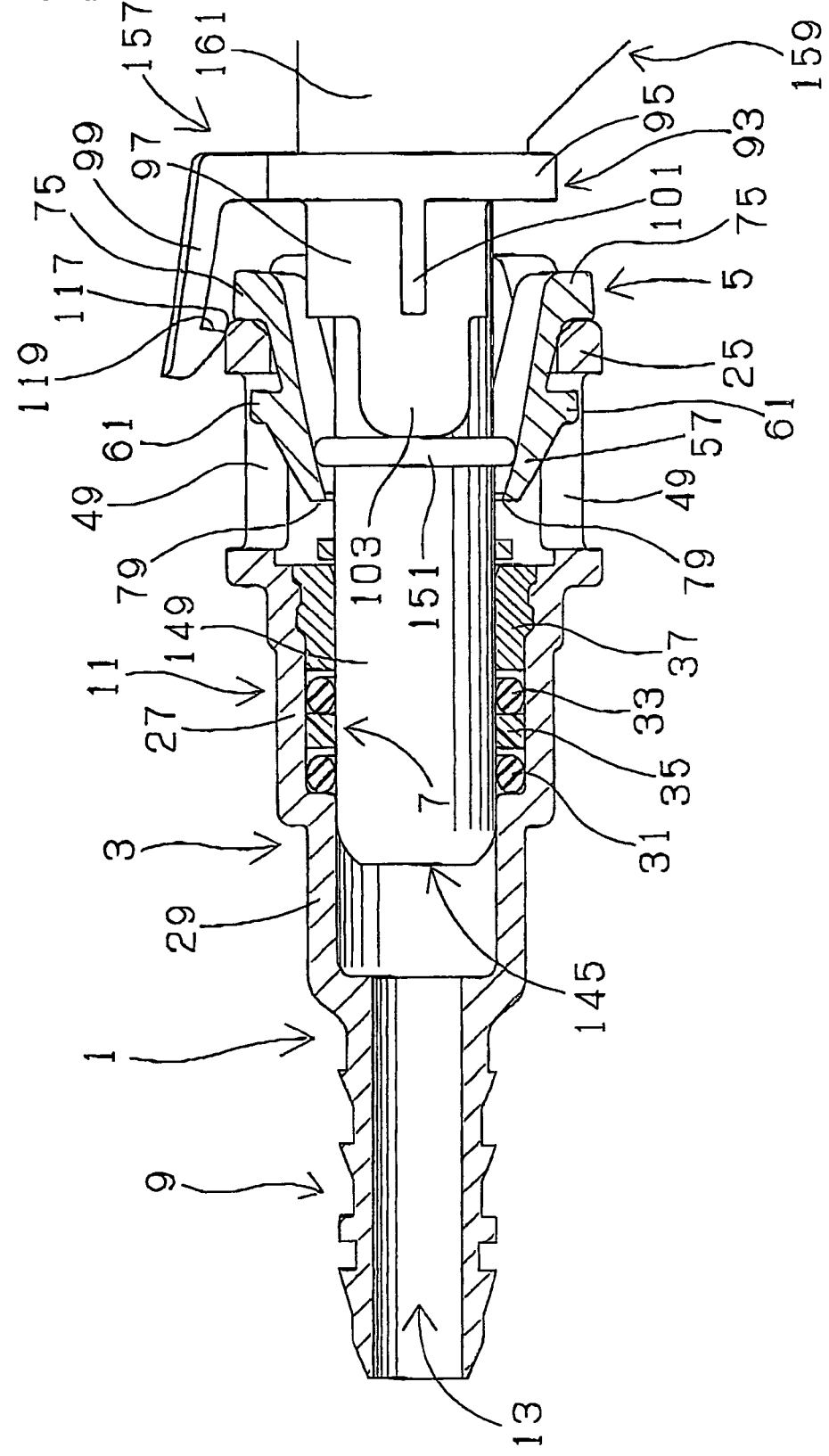
FIG. 22 is a view showing the third connection verifying device is mounted when the first quick connector and the second pipe are in half-fitting relation.

The body portion 93, the stop and verification arm 99 and the guide plate 101 of the third connection verifying device 157 are mounted, connected or engaged to the first quick connector 1 in a manner and a mode similar to the first connection verifying device 91. And, the third connection verifying device 157 has a connection verifying function for a pipe (the second pipe 145) and the first quick connector 1 and a connection assist function for a pipe (the second pipe 145) and the first quick connector 1 similarly to the first connection verifying device 91, as shown in FIG. 22.

When the third connection verifying device 157 moves relatively in one axial direction in a mounting process of the third connection verifying device 157, snap ribs 165, 165 of the clip plates 161, 161 abut the extending portion 155 of the second pipe 145. And the third connection verifying device 157 moves further relatively in one axial direction, then the extending portion 155 of the second pipe 145 widens a distance between the snap ribs 165, 165, passes therebetween, finally is fit-received or snap-fit-received between the snap ribs 165 and the continuous portion 163.

Figure 20:
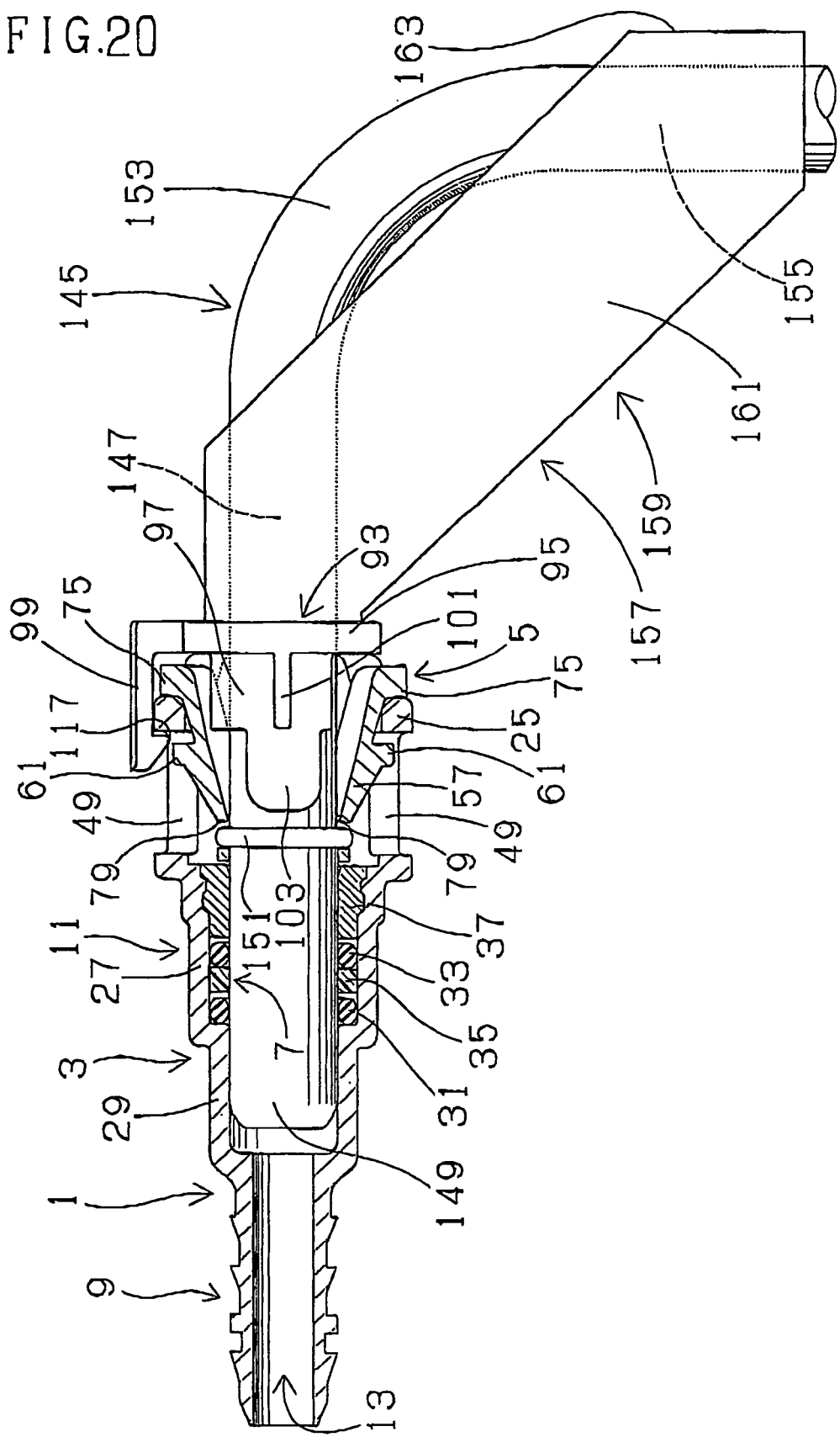
FIG. 20 is a sectional view of the third connection verifying structure.
Figure 21:
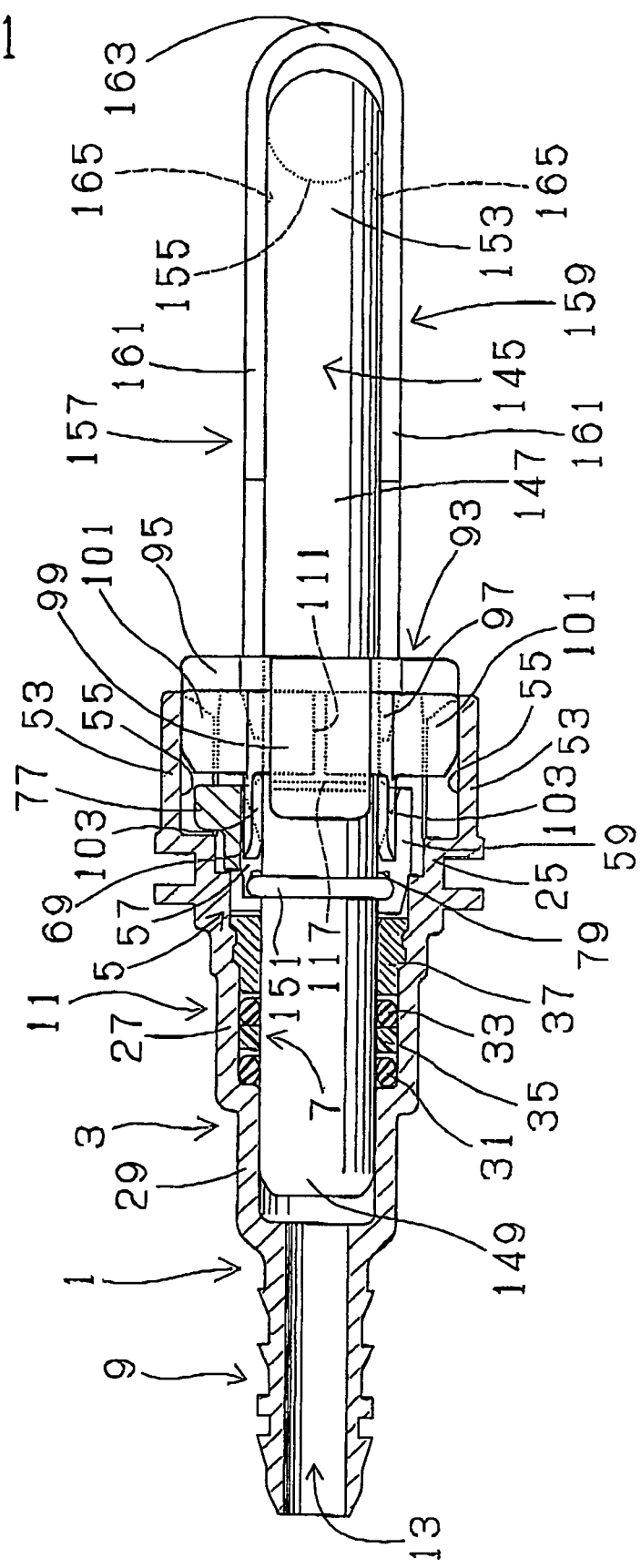
FIG. 21 is another sectional view of the third connection verifying structure.

In this manner, as shown in FIGS. 20 and 21, the third connection verifying device 157 is completely mounted, and thereby the third connection verifying structure is configured. The third connection verifying device 157 is mounted to the first quick connector 1 and the second pipe 145 so as not to be displaced with respect to the first quick connector 1 in the other axial direction by engagement of the hook portion 117 of the stop and verification arm 99 with the engagement window 49, not to rotate with respect to the first quick connector 1 by fit-engagement of the guide plate 101 (connector connecting portion) in the recessed engagement guide 55, and not to rotate with respect to the second pipe 145 by embracing or clipping and pressing the extending portion 155 or the bent portion side of the second pipe 145 with the clip plates 161, 161 (pipe connecting portion). When the third connection verifying device 157 is mounted on the assembled unit of the first quick connector 1 and the second pipe 145, the fit-on portion 97 is received in the retainer holding portion 25 on the other end of the retainer 5 with respect to the main body 57, while the abutment fingers 103, 103 are received between circumferentially opposite ends 59, 59 and in the recessed inner surface 69 of the main body 57 respectively. Therefore, the abutment fingers 103, 103 engage non-rotatably with the retainer 5 which is fitted in the retainer holding portion 25 of the connector housing 3 in anti-rotating relation therewith by engagement of the engagement tab 61 with circumferential ends of the engagement window 49. That means, non-rotatable engagement of the abutment finger 103 (connector connecting portion) with the retainer 5, and accordingly non-rotatable engagement thereof with the first quick connector 1 also allow the third connection verifying device 157 to be mounted to the first quick connector 1 so as not to rotate with respect to the first quick connector 1. And, if a width of the stop and verification arm 99 or the hook portion 117 is sized so as to correspond to a width of the engagement window 49, the stop and verification arm 99 engages non-rotatably with connector housing 3 or the first quick connector 1. Non-rotatable engagement relation between the stop and verification arm 99 and the first quick connector 1 further also allows the third connection verification device 157 to be mounted on the first quick connector 1 in anti-rotating relation therewith. In this embodiment, three types of connector connecting portions are defined in order to enhance restraint effects against rotation of the third connection verifying device 157. However, one or two types of connector connecting portions may be adapted to mount the third connection verifying device 157 to the first quick connector 1.

In the event of removing the third connection verifying device 157 from the assembled unit of the first quick connector 1 and the second pipe 145, engagement of the hook portion 117 of the stop and verification arm 99 with the engagement window 49 is released, the fit-on portion 97 and the abutment finger 103 are pulled out of the retainer holding portion 25 of the connector housing 3, and the extending portion 155 of the second pipe 145 is removed between the snap ribs 165 and the continuous portion 163. The third connection verifying device 157 which is removed may be again fitted on or to the assembled unit of the first quick connector 1 and the second pipe 145.

Figure 24:
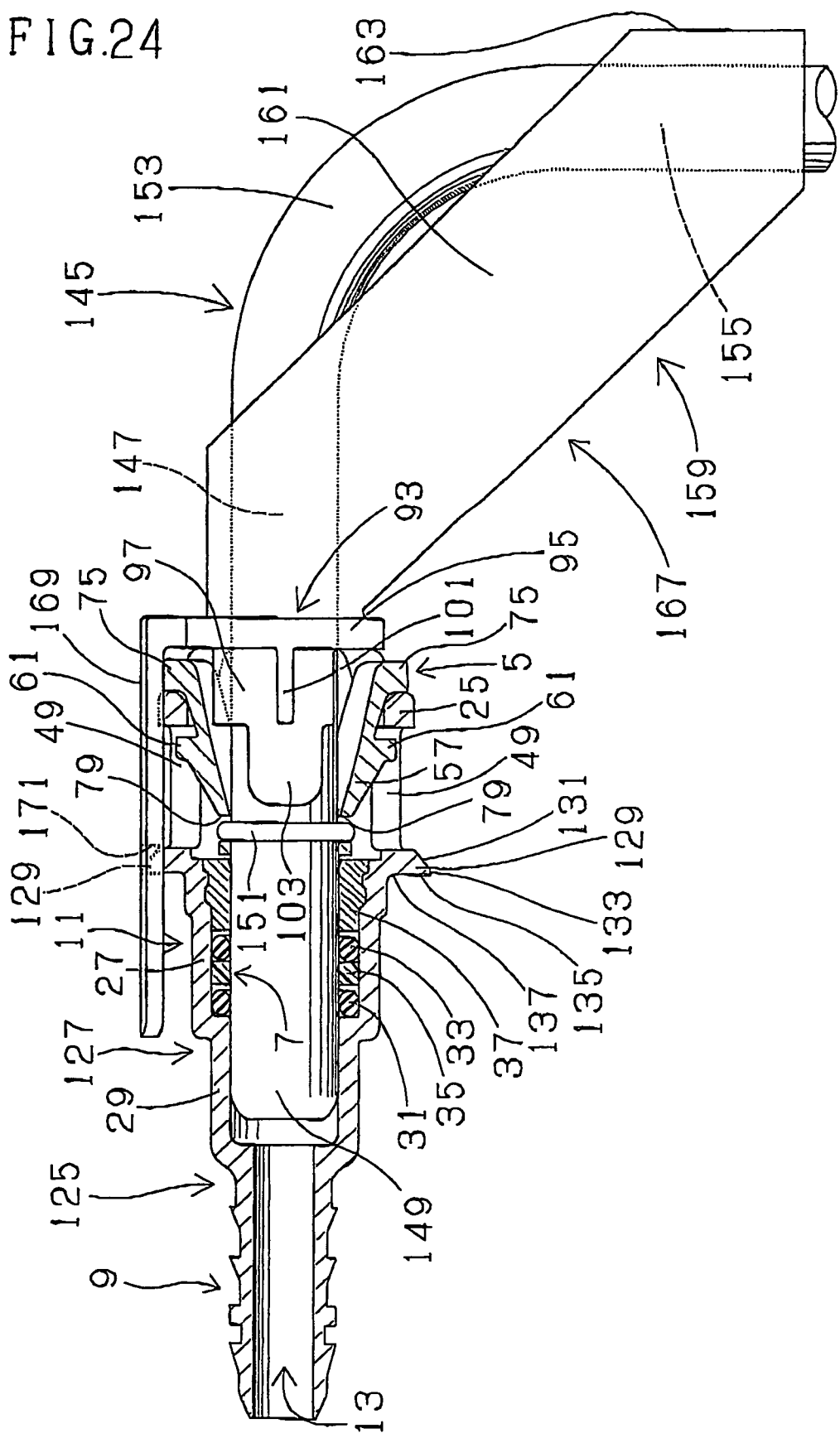
FIG. 24 is a sectional view of the fourth connection verifying structure.
Figure 25:
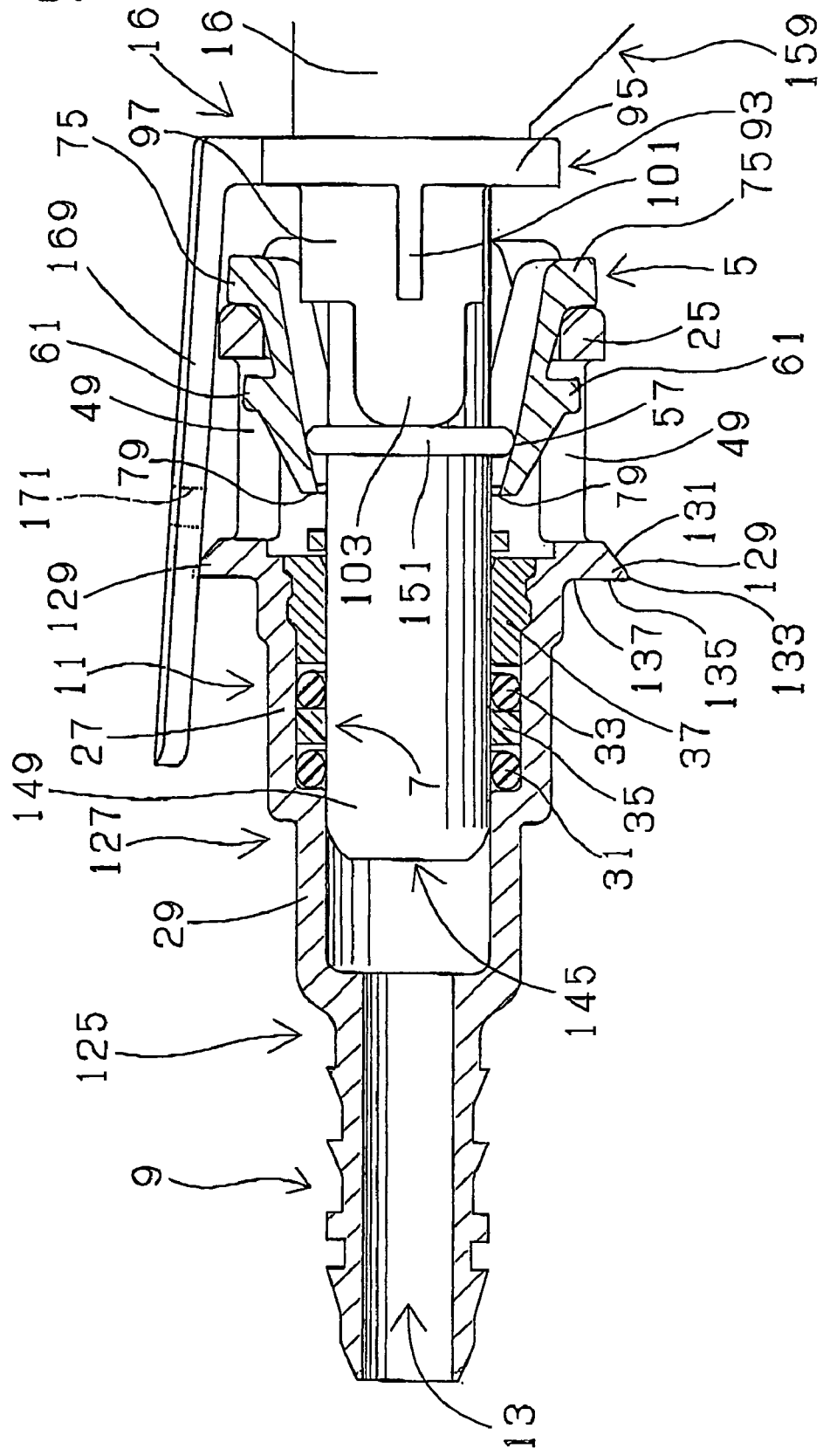
FIG. 25 is a view showing the fourth connection verifying device is mounted when the second quick connector and the second pipe are in half-fitting relation.

A fourth connection verifying structure for a pipe and a connector according to the present invention is explained with reference to FIGS. 23 to 25.

A fourth connection verifying device 167 for a pipe and a connector which is adapted in the fourth connection verifying structure, for example, made of resin, is configured by modifying the third connection verifying device 157. In the fourth connection verifying device 167, the stop and verification arm 99 of the third connection verifying device 157 is replaced by another stop and verification arm. Therefore, as to portions of configuration and functions identical to the third connection verifying device 157, identical numeral references are mostly given and explanations are mostly omitted herein.

Figure 23:
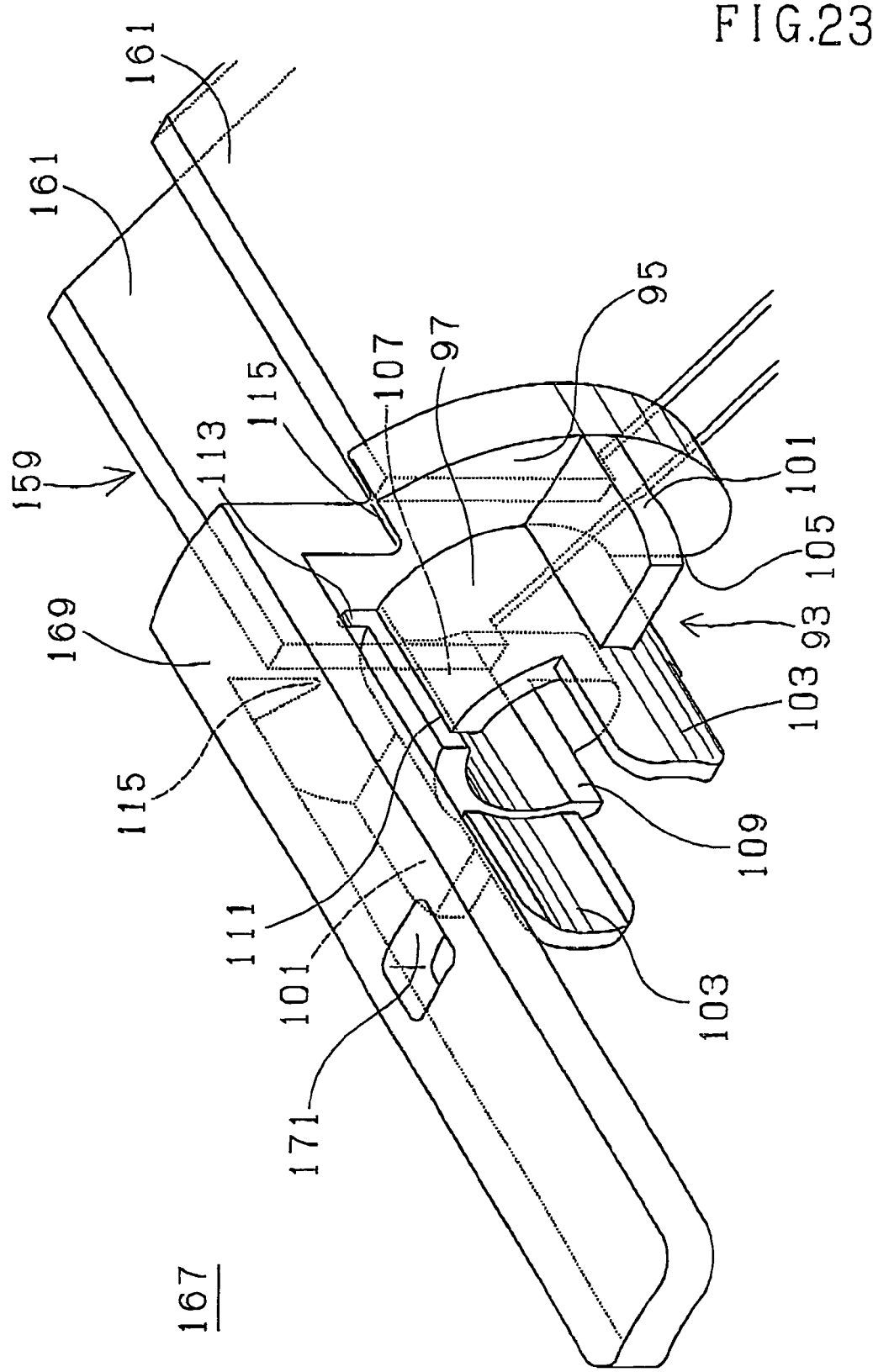
FIG. 23 is a perspective view showing a part of a body portion of a fourth connection verifying device for a pipe and a connector to be adapted in a fourth connection verifying structure for a pipe and a connector according to the present invention.

As shown in FIG. 23, in the fourth connection verifying device 167, a stop and verification arm 169 (verification means) extends long from an outer periphery of the abutment plate 95 in one axial direction, and this stop and verification arm 169 is formed with an engageable hole 171 (engaging portion) bored through radially on an axial center portion thereof. An axial distance from one end surface of the abutment plate 95 to one end of the engageable hole 171 is designed generally identical to an axial distance from the other end of the connector housing 127 to the engagement outer surface 135 of the engagement protrusion 129. A radially inner surface of the stop and verification arm 169 is formed in arc recessed or concaved radially outwardly in cross-section taken perpendicular to an axis so as to correspond to a radially outer surface of the engagement protrusion 129 and an outer peripheral surface of the retainer holding portion 25. Other configuration of the stop and verification arm 169 is generally identical to that of the stop and verification arm 99. Therefore, the stop and verification arm 169 has a configuration and a function similarly to the stop and verification arm 141 in the second connection verifying structure.

The body portion 93, the stop and verification arm 169 (the stop and verification arm 141) and the guide plate 101 of the fourth connection verifying device 167 are mounted, connected or engaged to the second quick connector 125 in a manner and a mode similar to the second connection verifying device 139. And, the fourth connection verifying device 167 has a connection verifying function for a pipe (the second pipe 145) and the second quick connector 125 and a connection assist function for a pipe (the second pipe 145) and the second quick connector 125 similar to the second connection verifying device 139, as shown in FIG. 25. The guide plates 101, 101 and the abutment fingers 103, 103 of the fourth connection verifying device 167 are engaged as connector connecting portion non-rotatably with the second quick connector 125 in a mode similar to the third connection verifying device 157. And the clip arm 159 of the fourth connection verifying device 167 is also connected as pipe connecting portion to the second pipe 145 in anti-rotating relation in a mode similar to the third connection verifying device 157. Further, similarly to the stop and verification arm 99, the stop and verification arm 169 of the fourth connection verifying device 167 which has the engageable hole 171 sized in width corresponding to the engagement protrusion 129 is engaged non-rotatably with the connector housing 127 or the second quick connector 125, and functions as connector connecting portion.

We claim:

1. An assembly for verifying complete mechanical connection between a pipe and a connector, said assembly comprising:

a generally cylindrical connector and a pipe inserted therein, the connector including a tube connecting portion on one end thereof and retainer means on the other end thereof, the retainer means having a connection engageable portion on a non-engageable part at a position displaced circumferentially from the connection engageable portion;

the pipe having an inserting end portion formed with an annular engagement projection on an outer peripheral surface thereof, the inserting end portion being inserted in the connector via an opening so that the annular engagement projection is snap-engaged with the connection engageable portion;

a connection verifying device for the pipe and the connector mounted to the pipe and the connector to verify mechanical connection between the pipe and the connector, the device, including:

a body portion mounted to the other end of the connector;

an abutment finger protruding from the body portion in one axial direction, and entering in the connector via the opening, and further formed so that one end of the abutment finger extends to an axial position of the connection engageable portion on the non-engageable part of the retainer means;

verification means constructed on the body portion and having an engaging portion, the engaging portion being engaged in the other axial direction with a stop portion formed on an axially fixed portion of the connector;

said engaging portion being formed to be positioned spaced in the other axial direction from the stop portion of the connector when the abutment finger abuts the annular engagement projection of the pipe which has not yet engaged with the connection engageable portion; and said abutment finger being formed further so as to move the annular engagement projection in one axial direction with respect to the retainer means to engage the annular engagement projection with the connection engageable portion when the abutment finger moves the annular engagement projection of the pipe from the position in which said annular engagement projection has not yet engaged with the connection engageable portion of the retainer means; and the stop portion being in a form of an engagement window provided in the connector for being engaged with the retainer means and thereby restraining the retainer means from escape from the connector.

2. The assembly as set forth in claim 1, wherein the body portion is provided with a connector connecting portion engaged with the connector in non-rotating relation and a pipe connecting portion connected to a bent portion of the pipe in non-rotating relation.

3. The assembly as set forth in claim 2, wherein the pipe connecting portion has a pair of clip members extending in the other axial direction and formed so as to clip a bent portion side of the pipe, the pair of clip members are integral with each other on the other axial end portions thereof so as to clip the bent portion side of the pipe on one axial end with respect to the other axial end portions thereof.

4. An assembly for verifying complete mechanical connection between a pipe and a connector, said assembly comprising:

a generally cylindrical connector and a pipe inserted therein, the connector including a tube connecting portion on one end thereof and retainer means on the other end thereof, the retainer means having a connection engageable portion on a non-engageable part at the position displaced circumferentially from the connection engageable portion;

the pipe having an inserting end portion formed with an annular engagement projection on an outer peripheral surface thereof, the inserting end portion being inserted in the connector via an opening so that the annular engagement projection is snap-engaged with the connection engageable portion;

a connection verifying device for the pipe and the connector mounted to the pipe and the connector to verify mechanical connection between the pipe and the connector, the device including:

a body portion mounted to the other end of the connector;

an abutment finger protruding from the body portion in one axial direction, and entering in the connector via the opening, and further formed so that one end of the abutment finger extends to an axial position generally identical to an axial position of the connection engageable portion on the non-engageable part of the retainer means;

verification means constructed on the body portion and having an engaging portion, the engaging portion being engaged in the other axial direction with a stop portion formed on an axially fixed portion of the connector;

said engaging portion being formed to be positioned spaced in the other axial direction from the stop portion of the connector when the abutment finger abuts the annular engagement projection of the pipe which has not yet engaged with the connection engageable portion; and said abutment finger being formed further so as to move the annular engagement projection in one axial direction with respect to the retainer means to engage the annular engagement projection with the connection engageable portion when the abutment finger moves the annular engagement projection of the pipe from the position in which said annular engagement projection has not yet engaged with the connection engageable portion of the retainer means;

the verification means being in a form of a stop and verification arm; and the stop and verification arm extending from the body portion in one axial direction beyond the stop portion, an engagement between the engaging portion and the stop portion being releasable by moving the stop and verification arm so as to lift up one axial end portion thereof radially outwardly; and a guide plate formed on the body portion so as to extend radially outwardly, and the body portion being mounted to the other end of the connector such that the guide plate seats in the recessed engagement guide that is formed in an inner peripheral surface of the connector.

5. The assembly as set forth in claim 4, wherein a pair of the guide plates are formed on diametrically symmetrical positions of the body portion, and a pair of the recessed engagement guides are formed so as to correspond in position to the pair of the guide plates.

* * * * *